(12) United States Patent
Djordjrvic et al.

(10) Patent No.: US 8,756,423 B2
(45) Date of Patent: Jun. 17, 2014

(54) SYSTEM AND METHOD FOR ESTABLISHING A SECURE GROUP OF ENTITIES IN A COMPUTER NETWORK

(75) Inventors: Ivan Djordjrvic, Chelmsford (GB); Theo Dimitrakos, Colchester (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 791 days.

(21) Appl. No.: 12/280,885

(22) PCT Filed: Feb. 21, 2007

(86) PCT No.: PCT/GB2007/000590
§ 371 (c)(1),
(2), (4) Date: Aug. 27, 2008

(87) PCT Pub. No.: WO2007/096604
PCT Pub. Date: Aug. 30, 2007

(65) Prior Publication Data
US 2009/0037736 A1    Feb. 5, 2009

(30) Foreign Application Priority Data
Feb. 27, 2006    (EP) .................................... 06251031

(51) Int. Cl.
*H04L 9/32*    (2006.01)
*H04L 29/06*    (2006.01)

(52) U.S. Cl.
USPC .............................................. 713/170; 726/9

(58) Field of Classification Search
None
See application file for complete search history.

(56) References Cited

U.S. PATENT DOCUMENTS

| 6,185,678 | B1 | 2/2001 | Arbaugh et al. |
| 6,807,636 | B2 | 10/2004 | Hartman et al. |
| 6,944,643 | B1 | 9/2005 | Ahmad et al. |
| 6,957,330 | B1 * | 10/2005 | Hughes .......................... 713/163 |

(Continued)

FOREIGN PATENT DOCUMENTS

| WO | 00/45256 | 8/2000 |
| WO | 03/091895 | 11/2003 |

(Continued)

OTHER PUBLICATIONS

International Search Report for PCT/GB2007/000590 mailed Apr. 26, 2007.

(Continued)

*Primary Examiner* — Michael R Vaughan
*Assistant Examiner* — Abdullah Almamun
(74) *Attorney, Agent, or Firm* — Nixon & Vanderhye P.C.

(57) ABSTRACT

This invention relates to a system and method for establishing a secure group of entities in a computer network, such as those originating from different trust domains, for the purpose of protecting the activity being executed. The invention allows for the on-demand automated creation of a virtual security perimeter around an arbitrary group of services originating from different trust domains. The security perimeter allows the activity being executed within the group to be protected, and for inter-group messages and communication to be kept confidential. A shared security context is also provided by which the group can be regulated, and new entities can be invited to join the group. The preferred embodiment of the invention has application to service orientated architectures and preferably makes use of existing technologies, such as W3C web services and security protocols, and OASIS service co-ordination protocols.

18 Claims, 13 Drawing Sheets

(56) References Cited

U.S. PATENT DOCUMENTS

| | | | |
|---|---|---|---|
| 6,973,657 | B1 | 12/2005 | Ahmad et al. |
| 2002/0067818 | A1 | 6/2002 | Barathan et al. |
| 2002/0169987 | A1 | 11/2002 | Meushaw et al. |
| 2003/0004746 | A1 | 1/2003 | Kheirolomoom et al. |
| 2003/0056093 | A1* | 3/2003 | Huitema et al. ............. 713/156 |
| 2003/0131245 | A1 | 7/2003 | Linderman |
| 2003/0196083 | A1* | 10/2003 | Grawrock et al. ............ 713/156 |
| 2004/0010682 | A1 | 1/2004 | Foster et al. |
| 2004/0039803 | A1 | 2/2004 | Law |
| 2004/0131187 | A1* | 7/2004 | Takao et al. ................... 380/255 |
| 2004/0136386 | A1 | 7/2004 | Miller et al. |
| 2004/0167984 | A1 | 8/2004 | Herrmann |
| 2004/0193912 | A1 | 9/2004 | Li et al. |
| 2004/0249950 | A1 | 12/2004 | Christensen et al. |
| 2004/0267901 | A1 | 12/2004 | Gomez |
| 2005/0027837 | A1 | 2/2005 | Roese et al. |
| 2005/0044197 | A1 | 2/2005 | Lai |
| 2005/0081038 | A1* | 4/2005 | Arditti Modiano et al. .. 713/176 |
| 2005/0081055 | A1 | 4/2005 | Patrick et al. |
| 2005/0086197 | A1 | 4/2005 | Boubez et al. |
| 2005/0138416 | A1 | 6/2005 | Qian et al. |
| 2005/0152542 | A1* | 7/2005 | Zheng et al. .................... 380/30 |
| 2005/0160289 | A1 | 7/2005 | Shay |
| 2005/0169461 | A1* | 8/2005 | Canard et al. ................... 380/28 |
| 2005/0172133 | A1 | 8/2005 | Brumme et al. |
| 2005/0183021 | A1 | 8/2005 | Allen et al. |
| 2005/0246552 | A1 | 11/2005 | Bade et al. |
| 2006/0013400 | A1* | 1/2006 | Sutton et al. ................... 380/278 |
| 2006/0015728 | A1 | 1/2006 | Ballinger et al. |
| 2006/0041669 | A1 | 2/2006 | Bemmel et al. |
| 2006/0048210 | A1 | 3/2006 | Hildre et al. |
| 2006/0069662 | A1 | 3/2006 | Laborczfalvi et al. |
| 2006/0256107 | A1 | 11/2006 | Scarlata et al. |
| 2007/0124797 | A1 | 5/2007 | Gupta et al. |
| 2007/0239987 | A1 | 10/2007 | Hoole et al. |
| 2008/0022385 | A1 | 1/2008 | Crowell et al. |
| 2008/0148377 | A1 | 6/2008 | Kumar et al. |

FOREIGN PATENT DOCUMENTS

| | | |
|---|---|---|
| WO | 2006/001193 A1 | 2/2006 |
| WO | 2006/011943 | 2/2006 |
| WO | 2007/099276 | 9/2007 |

OTHER PUBLICATIONS

Patrick McDaniel et al.; 1999; "Antigone: a flexible framework for secure group communication"; In Proceedings of the 9th Conference on USENIX Security Symposium—vol. 8 (SSYM'99); vol. 8; USENIX Association, Berkeley, CA, USA pp. 99-114.

Hongbin Liu, Geoffrey Fox, Marlon Pierce, Shrideep Pallickara; A Multi-party Implementation of WS-SecureConversation Technical Report, Apr. 2005, 13 pgs.

State of the Art Evaluation—phase 1, WP10 State of the Art Deliverable; Imperial College London, Jun. 10, 2004, Issue 1; 374 pgs. (with emphasis on pp. 283-290).

TCG Specification Architecture Overview, Specification Revision 1.2, Apr. 28, 2004., 54 pgs.

Sandro Rafaeli and David Hutchison; 2003; "A survey of key management for secure group communication"; ACM Comput. Surv. 35; 3 (Sep. 2003); pp. 309-329.

IBM Research Report; vTPM: Virtualizing the Trused Platform Module; Stefan Berger et al.; IBM Research Division, Yorktown Heights, NY; Feb. 14, 2006., 17 pgs.

Basic TrustCOM reference implementation—deliverable 19., 90 pgs.
Workshop on Grid Security Practice and Experience (UK e-Science Security Task Force), Oxford, Jul. 8-9, 2004; see especially "Dynamic Security Perimeters for Grid-enabled Collaboration" by T. Dimitrakos et al., and "Multilayer Privilege Management for Dynamic Collaborative Scientic Communities" by David Chadwick et al., 25 pgs.

Anderson, R. et al.; "Cryptographic Processors—A Survey"; Proceedings of the IEEE; vol. 94, No. 2; pp. 357-369; Feb. 2006.

N. Asokan and P. Ginzboorg; "Key agreement in ad hoc networks"; Computer Communications; vol. 23; Issue 17; Nov. 1, 2000; pp. 1627-1637.

T. Garfinkel et al.; "Terra: a virtual machine-based platform for trusted computing"; SIGOPS Oper. Syst. Rev. 37, 5 (Oct. 2003)., 14 pgs.

M. Rosenblum and T. Garfinkel; "Virtual machine monitors: current technology and future trends"; *Computer*; vol. 38, No. 5; pp. 39-47; May 2005.

Book Chapter; Authors: L. Chen and T. Pedersen; Editor: De Santis, Alfredo; Primary Title: New group signature schemes; Book Title: Advances in Cryptology—EUROCRYPT'94; Book Series Title: Lecture Notes in Computer Science; Copyright: 1995; Publisher: Springer Berlin/Heidelberg; Isbn: 978-3-540-60176-0; Subject: Computer Science; Start p. 171; End p. 181; vol. 950.

Luis Felipe Cabrera et al.; Web Services Coordination (WS-Coordination); Version 1.0; Aug. 2005; 23 pgs.

B. Lehane et al.; Shared RSA key generation in a mobile ad hoc network; In Proceedings of the 2003 IEEE conference on Military communications—vol. 11 (MILCOM'03); vol. 11; IEEE Computer Society, Washington, DC, 2003; pp. 814-819.

International Search Report for PCT/GB2008/001077 mailed Sep. 24, 2008., 2 pgs.

Written Opinion of the International Searching Authority for PCT/GB2008/001077 mailed Sep. 24, 2008., 8 pgs.

Djordjevic et al., "Dynamic security perimeters for inter-enterprise service integration"; Future Generations Computer Systems; vol. 23; No. 4; (Feb. 2, 2007); pp. 633-657.

Orlova A., et al.; "Basic TrustCoM Reference Implementation"; Internet Citation; (Sep. 30, 2005)., 90 pgs.

Wilson M. D. et al.; "TrustCoM Framework V2"; Internet Citation; (Jan. 31, 2006)., 182 pgs.

Office Action (16 pgs.) dated Oct. 19, 2012 issued in co-pending U.S. Appl. No. 12/594,059.

IBM Research Report; vTPM: Virtualizing the Trused Platform Module; Stefan Berger et al,; IBM Research Division, Yorktown Heights, NY; Feb. 14, 2006., 17 pgs.

Book Chapter; Authors: L. Chen and T. Pedersen; Editor: De Santis, Alfredo; Primary Title: New group signature schemes; Book Title: Advances in Cryptology—EUROCRPT'94; Book Series Title: Lecture Notes in Computer Science; Copyright: 1995; Publisher: Springer Berlin/Heidelberg; Isbn: 978-3-540-60176-0; Subject: Computer Science; Start p. 171; End p. 181; vol. 950.

Maierhofer A., Dimitrakos T., Titkov L., Brossard, D.: Extendable and Adaptive Message-Level Security Enforcement Framework, In proceedings of the International conference on Networking and Services, (ICNS '06), Paolo Alto, Jul. 2006, ISBN: 0-7695-2622-5 (10 pgs.).

Creasy R.J.: The Origin of the VM/370 Time-Sharing System, IBM Journal of Research and Development, 25(5):483, Sep. 1981—available via ftp://ftp.cis.upenn.edu/pub/cis700-6/public_html/04f/papers/creasy-vm-370.pdf (8 pgs.).

Figueiredo R., Dinda P.A., Fortes J.: Resource Virtualization Renaissance, IEEE Computer Magazine, 38(5):28-31, 2005, (4 pgs.).

Goldberg R.P.: Survey of Virtual Machine Research, IEEE Computer Magazine, 7(6):34-45, 1974—available via http://cseweb.ucsd.edu/classes/wi08/cse221/papers/goldberg74.pdf (12 pgs.).

Nanda S., Chiueh T.: A Survey of Virtualization Technologies, Research Proficiency Report, Stony Brook, ECSL-TR-179, Feb. 2005—available via http://www.ecsl.cs.sunysb.edu/tr/TR179.pdf (42 pgs.).

Jiang X., Xu D.: SODA: A Service-On-Demand Architecture for Application Service Hosting Utility Platforms, In proceedings of 12th IEEE International Symposium on High Performance Distributed Computing, pp. 174, 2003 (10 pgs.).

Mao W., Yan F., Chen C.: Daonity: Grid Security With Behaviour Conformity from Trusted Computing, In proceedings of the First ACM Workshop on Scalable Trusted Computing, pp. 43-46, ISBN: 1-59593-548-7, 2006, (4 pgs.).

Leiva R.G., Rodríguez I.H., Álvaro D.M., Warren P., Djordjevic I., Dimitrakos T., Romano N., Biette M.: A Grid Computing for Online

(56) References Cited

OTHER PUBLICATIONS

Games. In proceedings of Game Design and Technology Workshop 2006 (GDTW'06), Liverpool, UK, Nov. 2006—is pp. 41 to 45 of http://www.cms.livjm.ac.uk/library/AAA-GAMES-Conferences/GDTW/2006/GDTW2006-Proceedings.pdf (5 pgs.).
Dimitrakos T.: Research challenges for the convergence of SOA platforms and next generation networking; Securing Application Integration within and across Enterprises; Security Research Centre, BT Group CTO, Feb. 2007 (24 pgs.).
Ian Foster, Carl Kesselman, Jeffrey M. Nick, Steven Tuecke. The Physiology of the Grid : An Open Grid Services Architecture for Distributed Systems Integration. Globus Alliance Technical Report 2002 (31 pgs.).
Ian Foster, C. Kesselman, J. Nick, S. Tuecke, "Grid Services for distributed systems", *IEEE Computer* 2002, (10 pgs,).
Burton Group. "Turning the Network into the Computer: The Emerging Network Application Platform". *Application Platform Strategies Report*, 2005, (50 pgs.).
J. Kephart and D. Chess, "The Vision of Autonomic Computing". *Computer Magazine*, IEEE, 2003, (10 pgs.).
T. Dimitrakos, D. Golby, P. Kearney. "Towards a Trust and Contract Management Framework for Dynamic Virtual Organisations". In *eAdoption and the Knowledge Economy; Issues, Applications, Case Studies*, 2004 IOS Press Amsterdam, ISBN: 1-58603-470-7, (9 pgs.).
Theo Dimitrakos, Giuseppe Laria, et al. "Towards a Grid Platform Enabling Dynamic Virtual Organisations for Business Applications". In Proc. of *3rd Int. Conf on Trust Management, iTrust:2005*.LNCS Springer, 2005, (5 pgs.).
Dimitrakos, T., Enabling Dynamic Security Perimeters for Virtual Collaborations, Central Laboratory of the Research Councils, Rutherford Appleton Lab., UK; CRMPA, Universita di Salerno, Italy, IOS Press, 2004 (8 pgs.).
Sonic Software, Systinet, Amber Point, Bearing Point. "A new Service-Oriented Architecture (SOA) Maturity Model". White paper release Oct. 27, 2005, (28 pgs.).
Foster, A Globus Primer, Or, Everything You Wanted to Know about Globus, but Were Afraid to Ask, Describing Globus Toolkit Version 4, May 8, 2005 (69 pgs.).
DataPower SML Web Services Access Control and Federated Identity Management, 2005 RSA Security Inc., (2 pgs.).
RSA Secured Implementation Guide for XML Gateway/Firewall Products, Last Modified Jun. 9, 2005 (6 pgs.).
Layer 7 Technologies, XML Appliances for SOA and Web 2.0, Secure, Simplify and Scale Your Web Services, 2006 (2 pgs.).
Forum Systems XWall Web Services Firewall, a solid security solution, by Brian Barbash, Oct. 2004 (2 pgs.).
Keith Ballinger et al., Web Services Metadata Exchange (WS-MetadataExchange), Sep. 2004 (23 pgs.).
Siddharth Bajaj et al., Web Services Policy Attachment (WS-PolicyAttachment), Mar. 2006 (29 pgs.).
Dimitrakos, T. et al. 2004. TrustCoM—A Trust and Contract Management Framework enabling Secure Collaborations in Dynamic Virtual Organisations. *ERCIM News* No. 59, pp. 59-60, Oct. 2004 (2 pgs.).
Steven M. Bellovin, "Distributed Firewalls", Nov. 1999 issue of ;login, pp. 37-39.
Berger, Stefan et al., "vTPM: Virtualizing the Trusted Platform Module", IBM T.J. Watson Research Center, NY, USENIX Association, Security '06, 15$^{th}$ USENIX Security Symposium, 2006, 16 pgs.
TCG Generic Server Specification, Specification Version 1.0, Revision 0.8, Mar. 23, 2005, 42 pgs.
OASIS Web Services Security: SOAP Message Security 1.0 (WS-Security 2004), OASIS Standard 200401, Mar. 15, 2004, 56 pgs.
Reiner, Sailer et al., "Proceedings of the 13$^{th}$ USENIX Security Symposium", San Diego, CA, Aug. 9-13, 2004, 17 pgs.
Wenbo Mao et al., "Innovations for Grid Security from Trusted Computing", Hewlett-Packard Laboratories, Bristol, UK; Huazhong University of Science and Technology, Wu Han, China, Oxford University Software Engineering Centre, Oxford, UK, Jun. 7, 2005, 14 pgs.
John Marchesini et al., "Experimenting with TCPA/TCG Hardware, Or: How I Learned to Stop Worrying and Love The Bear", Computer Science Technical Report TR2003-476, Dec. 15, 2003, 20 pgs.
James Gosling and Henry McGilton, "The Java Language Environment", A White Paper, Sun Microsystems Computer Company, Oct. 1995, 86 pgs.
Bruce Schneier, Crypto-Gram Newsletter, Aug. 15, 2002, 10 pgs. Retrieved from http://www.schneier.com/crypto-gram-0208.html.
Jon Oltsik, "Trusted Enterprise Security", How the Trusted Computing Group (TCG) Will Advance Enterprise Security, White Paper ESg Enterprise Strategy Group, Jan. 2006, 13 pgs.
Office Action (8 pgs.) dated Mar. 7, 2012 issued in co-pending U.S. Appl. No. 12/594,045.
Christensen et al., Web Services Description Language (WSDL) 1.1, W3C Note Mar. 15, 2001, 31 pgs.
OASIS Web Services Resource Properties 1.2 (WS-ResourceProperties), Working Draft 04, Jun. 10, 2004, 52 pgs.
Box, Don et al., "Web Services Addressing (WS-Addressing)", W3C Member Submission Aug. 10, 2004, 23 pgs.
SOAP Version 1.2 Part 1: Messaging Framework, W3C Recommendation Jun. 24, 2003, 52 pgs.
Fielding, R. et al., Hypertext Transfer Protocol—HTTP/1.1 Memo, The Internet Society 1999, 114 pgs.
Extensible Markup Language (XML) 1.0 (Third Edition), W3C Recommendation Feb. 4, 2004, 59 pgs.
OASIS Web Services Distributed Management: Management Using Web Services (MUWS 1.0) Part 1, OASIS Standard, Mar. 9, 2005, 30 pgs.
Tuecke, S. et al., "Web Services Base Faults (WS-BaseFaults)", Version 1.0, Mar. 31, 2004, 11 pgs.
OASIS Web Services Base Notification 1.3 (WS-BaseNotification), Public Review Draft 02, Nov. 28, 2005, 64 pgs.
Web Services Message Exchange Patterns, Draft 22 Jul. 2002, 3 pgs.
Service-oriented architecture (SOA) definition, article, Barry & Associates, Copyright 2000-2013, 5 pgs.
World Wide Web Consortium Supports the IETF URI Standard and IRI Proposed Standard, URI Specification Updated, IRIs Allow Internationalized Web Addressing, Jan. 26, 2005, 3 pgs.
OASIS Web Services Topics 1.3 (WS-Topics), Public Review Draft 01, Dec. 16, 2005, 39 pgs.
OASIS Web Services Brokered Notification 1.3 (WS-BrokeredNotification), Public Review Draft 02, Nov. 28, 2005, 45 pgs.
Alexey Orlov et al., "Basic TrustCom reference implementation", Deliverable 19, Version 1.0, Sep. 2005, 186 pgs.
Birrell, A. D. and Nelson, B. J., "Implementing Remote Procedure Calls", Xerox Palo Alto Research Center, ACM Transactions on Computer Systems, vol. 2, No. 1, Feb. 1984, pp. 39-59.
Common Object Request Broker Architecture: Core Specification, CORBA Specification, Mar. 2004, Version 3.0-3, 1152 pgs.
CCLRC, RAL-TR-2006-009, State of the art survey on trust, security and contract management in web services and Grid computing, Mar. 2006, 441 pgs.
Ryutov, T. and Neuman, C., "The Specification and Enforcement of Advanced Security Policies", Proceedings of the Third International Workshop on Policies for Distributed Systems and Networks (Policy '02), 2002, pp. 128-138.
Dimitrakos, T. et al., "Policy-Driven Access Control and a Distributed Firewall Architecture", Proceedings of the Third International Workshop on Policies for Distributed Systems and Networks (Policy '02), 2002, pp. 228-231.
International Search Report for PCT/GB2008/001079, mailed May 6, 2008.
Written Opinion of the Int'l Searching Authority for PCT/GB2008/001079, mailed May 6, 2008.
Berger, S et al, "IBM Research Report RC23879, VtPM: Virtualizing the Trusted Platform Module", Internet Citation, (Feb. 14, 2006).
Vecellio et al., "Infrastructure-based Mediation for Enforcement of Policies in Composed and Federated Application", Jul. 21, 2003, pp. 1-8, XP002388699.
International Search Report for PCT/GB2006/004088, mailed Feb. 20, 2007.

(56) References Cited

OTHER PUBLICATIONS

Djordjevic et al., "Virtualized Trusted Computing Platform for Adaptive Security Enforcement of Web Services Interactions," 2007 IEEE International Conference on Web Services (ICWS 2007) (8 pgs.).
Nair et al., "Secure Web Services Federation Management using TPM Virtualisation," ACM, SWS '07, Nov. 2, 2006, pp. 73-80.
"Virtual Trusted Platform Module", IBM article, May 2, 2006 (4 pgs.).
Web page "The Xen virtual machine monitor", University of Cambridge Computer Laboratory, 2008 (2 pgs.).
"Xen ups the security ante", 2006, (2 pgs.) downloaded from www.vnunet.com/articles/print/2137789.
"Trusted Computing", Wikipedia, Retrieved from http://en.wikipedia.org/wiki/Trusted_Computing, Jan. 12, 2007, 11 pgs.
Roger L. Kay, President, Endpoint Technologies Associates "Trusted Computing is Real and it's Here", Jan. 29, 2007, 6 pgs.
Microsoft White Paper entitled "Trusted Platform Module Services in Windows Longhorn", Apr. 25, 2005 (10 pgs.).
Bray et al., Extensible Markup Lanugaeg (XML) 1.0 (Third Edition), W3C Recommendation Feb. 4, 2004, 35 pgs.
Birrell, A.D. and Nelson, B.J., "Implementing Remote Procedure Calls", Xerox Palo Alto Research Center, ACM Transactions on Computer Systems, vol. 2, No. 1, Feb. 1984, pp. 39-59.
Djordjevic et al., "Dynamic security perimeters for inter-enterprise service integration"; Future Generation Computer Systems, vol. 23, No. 4, (Feb. 2, 2007), pp. 633-657.
Chivers, Howard and Martin, Andrew; Workshop on Grid Security Practice and Experience; Jul. 2004; Oxford; pp. 11-15 to 11-25.
C. Steel, R. Nagappan and R. Lai, *Core Security Patterns*, Prentice Hall and Sun Microsystems, Dec. 2005 (Figure 8-4 only) (1 pg.).
Office Action (20 pgs.) dated Jul. 25, 2013 issued in co-pending U.S. Appl. No. 12/594,059.
Notice of Allowance (14 pgs.) dated Jul. 31, 2013 issued in co-pending U.S. Appl. No. 12/594,045.
Office Action dated Aug. 16, 2013 (14 pgs.) issued in co-pending U.S. Appl. No. 12/180,887.
Web page—"Trusted Computing" Frequently Asked Questions, Version 1.1 (Aug. 2003), 16 pgs. Retrieved from http://www.cl.cam.ac.uk/~rja14/tcpa-faq.html.
Berners-Lee, T. et al., Uniform Resource Identifier (URI): Generic Syntax Memo, The Internet Society 2005, 61 pgs.

\* cited by examiner

SYSTEM AND METHOD FOR ESTABLISHING A SECURE GROUP OF ENTITIES IN A COMPUTER NETWORK

This application is the U.S. national phase of International Application No. PCT/GB20071000590 filed 21 Feb. 2007 which designated the U.S. and claims priority to European Patent Application No. 06251031.8 filed 27 Feb. 2006, the entire contents of each of which are hereby incorporated by reference.

This invention relates to a system and method for establishing a secure group of entities in a computer network, such as those originating from different trust domains, for the purpose of protecting the activity being executed.

A paper entitled "Antigone: A Flexible Framework for Secure Group Communication" presented in the Proceedings of the USENIX Security Symposium 1999 and written by Patrick McDaniel and others, discloses a system for providing multi-party communications with security in such a way the system can be easily configured to meet the differing security demands of different applications.

A Service Orientated Architecture (SOA) is a computer architecture in which a number of services or entities are made available on a network to support the requirements of software users. A service is a self-contained software function that accepts requests and returns a response through a defined standard interface. Services may also perform units of work such as editing or processing a transaction.

Most SOAs rely on the concept of Web Services (WS), although any service based technology can be used to implement a SOA. Web Services are designed specifically to support machine to machine interactions over a network such as the World Wide Web. They typically have one or more standard interfaces, defined in a machine processable format such as WSDL (Web Services Description Language), through which the service can be accessed by other systems or software applications regardless of the programming language in which they are implemented or the platform on which they are run. In this way, software systems and applications can use Web Services to exchange data over the computer network. OASIS (www.oasis-open.org) and W3C (www.w3.org) are the two primary committees responsible for developing and standardising Web Services architecture.

Security and trust are important requirements for the transmission of messages between entities. The question is how can an entity that has received a message, such as a request for service, know that the identity provided by the entity is correct?

Key to the concept of identity are the notions of claims and credentials. An entity will identify itself to another entity by means of a claim, which is a declaration such as name, identity, key, group, privilege, capability, attribute, and so on. To support the claim, the entity will provide a credential which acts as a statement that the claim is valid. A credential therefore acts as proof of the qualification, competence, or clearance of a network entity (e.g. person, service, resource) that is sufficient for deriving a security attribute of that entity.

In a public key encryption scheme for example, an entity may provide a credential by digitally signing the claims transmitted in the message with its own private encryption key. A recipient can validate the signature of the message using the entity's public key, which it has obtained in advance, and be sure that the message has not been tampered with during transmission. In this way the message integrity can be assured. However, despite the use of the private key encryption, the recipient cannot be sure that the claims made by the entity are authentic, that is originating from a genuine sender.

A digital certificate can be used to address this, by binding the public key of the entity to a statement of its identity. The digital certificate is issued by a trusted third party, so that the recipient can be sure that the public key it is using belongs to the entity. The trusted third party may also sign the claims of an entity to indicate that these are valid.

A trust realm is an administered security space, in which the source and target of a request can determine and agree whether particular sets of credentials, such as a digital signature and certificate, provided by a source satisfy the security policies of the target. The target may defer the trust decision to a third party (if this has been established as part of the agreement) thus including the trusted third party in the trust realm. A federation is the term given to a collection of trust realms that have established a degree of trust between themselves. The degree of trust will be of importance as a network entity in one trust realm attempts to communicate with a different service in another; the level of trust between realms may vary.

In a SOA, entities from one or more trust realms may collaborate for the purpose of executing a common activity. This can be based on a predefined transaction protocol, drawn from a well-defined business process definition, or more generally, can be an evolving interaction between participating services which collaborate within a group. Where the activity is a service provided to a requester, the collection of entities or services executing the activity are known as a service aggregation, and the service provided to the requester is known as a composite service. The rules of interactions are governed by a set of policies that are defined in different trust realms, in addition to these commonly agreed for the purpose of the activity, and which are applicable in the context of that particular activity only.

To coordinate the interaction of the service in a group, SOA provides a coordination service, such as that defined in the OASIS WS-Coordination Specification. A coordination service issues a unique identifier, known as a context, to members of a group such that the group members can identify each other and know the policies and protocols by which they are to interact.

While the existing technology provides some security in the form of enforceable policy, coordinated behaviour protocols, and certainty of identity, we have appreciated that additional security would be desirable for the cooperation of entities in a group activity.

In particular, we have appreciated that a system and protocol are required that allow a trusted and secure environment to be established dynamically between services in from different trust realms, and that prevents services that have not obtained a valid group membership from participating in the group, or accessing group communications.

SUMMARY OF THE INVENTION

The invention is defined in the independent claims to which reference should now be made. Advantageous features are set out in the dependent claims.

According to a first aspect of the present invention, there is provided a method of establishing a secure group of entities in a computer network, comprising:
  a) receiving a request from a first entity for the creation of a group;
  b) creating a group identifier, and a first public/private key pair for the group;
  c) transmitting the group identifier and first group public key to the entity;

d) verifying whether the first entity is authorised to join the group, and if it is transmitting the first group private key to the entity;

e) receiving a request from a second entity to join the group specified by the group identifier, the second entity having received the group identifier and the first group public key; and f) verifying whether the second entity is authorised to join the group, and if it is, transmitting the first group private key to the second entity, such that messages signed with the first group private key can be verified as messages from an authentic group member.

Advantageous features in preferred embodiments of the present invention include:

i) the group identifier includes one or more of a string, or a group token.

ii)—as i), wherein the string is a universal unique identifier.

iii)—as i) or ii), wherein the group token contains information describing the group, and/or validity information for the group.

iv)—as i), ii) or iii), wherein the group token is created to be unique for the group.

v)—as i), ii) or iii), comprising issuing each entity with an identity token containing information describing the entity.

vi)—as v), wherein the group token additionally contains information describing the entity, such that the group token is unique for each entity.

vii)—as vi), wherein the group token uniquely binds to the identity token.

viii), the computer network comprises a co-ordination service comprising an activation service, and registration service, the co-ordination service being configured to carry out at least steps a), d), e) and f).

ix)—as viii), wherein the registration service carries out the verification steps by communicating with a Policy Decision Point (PDP).

x)—as viii) or ix), wherein the group token and the public/private key pair are created by a Security Token Service (STS).

xi)—as x), wherein in step c), the group token is transmitted from the STS to the first entity.

xii)—as x), wherein in step c), the group token is transmitted from the STS to the activation service to the first entity.

xiii) the method further comprising including the group identifier in the header of all messages between first and second entities.

xiv)—as xiii), wherein the group identifier is incorporated into the header of SOAP messages transmitted between entities.

xv) the first and second entities are provided within different trust realms, each realm having a respective Security Token Service (STS).

xvi)—as xv), wherein the private key is delivered to the second entity via the STS of the realm in which the first entity is located.

xvii)—as xv), wherein the private key is delivered to the second entity via the STS of the realm in which the second entity is located.

xviii) wherein the computer network employs a service orientated architecture.

xix) wherein the entity is a W3C Web Service.

BRIEF DESCRIPTION OF THE DRAWINGS

Preferred embodiments of the invention will now be described in more detail by way of example and with reference to the drawings in which.

DETAILED DESCRIPTION OF THE INVENTION

Figure 1:
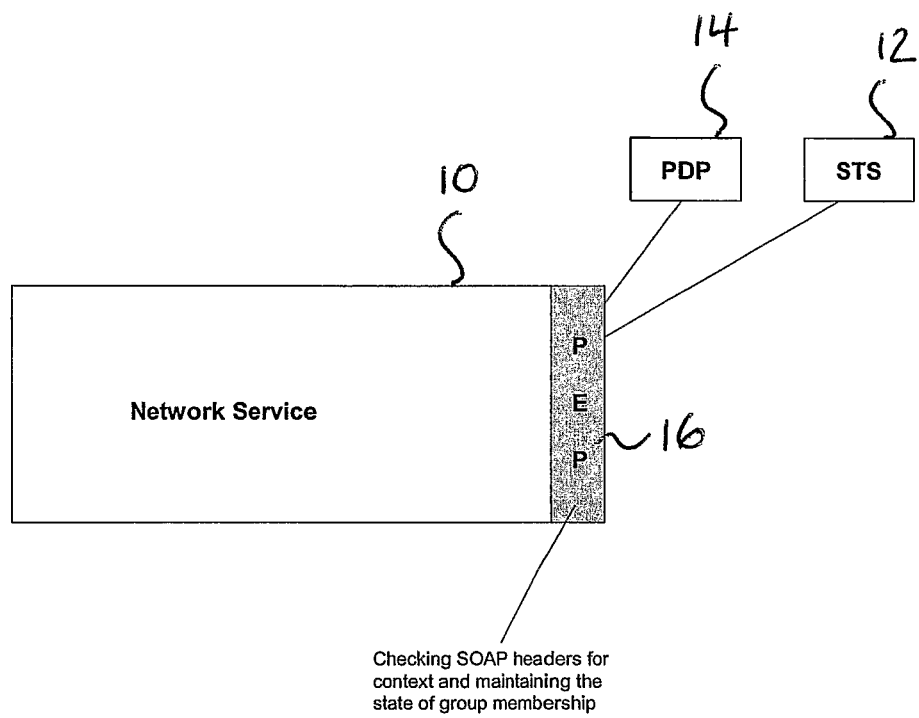
FIG. 1 is a schematic illustration of a known network service and connected functionality.

The preferred embodiment of the invention provides a system and protocol that allow for the on-demand automated creation of a virtual security perimeter around an arbitrary group of services originating from different trust domains. The security perimeter allows the activity being executed within the group to be protected, and for inter-group messages and communication to be kept confidential. A shared security context is also provided by which the group can be regulated, and new entities can be invited to join the group. In order to cover the most general case, in the remainder of the document the term (secure) "group" will be used to refer to the collection of services participating in the execution of a (secured) activity.

The preferred embodiment of the invention provides service orientated architectures with additional security for collaboration between entities. In doing so, it preferably makes use of the various technologies mentioned above, such as W3C web services and security protocols, and OASIS service co-ordination protocols. These will now be discussed in more detail.

The services that are illustrated in the following description are preferably W3C Web Services. Furthermore, use is made of the other features of the Web Services Architecture of W3C such as the notions a Message Exchange Pattern, and a (SOAP) Message Interceptor. A message is the basic unit of communication sent from one web services agent to another, such as a web service and a requester. A Message Exchange Pattern (MEP) is a template that describes a generic pattern for the exchange of messages between agents, independent of application semantics. It describes a pattern for message exchange in terms of temporal, causal, and sequential relationships between messages, as well as the normal and abnormal termination of any message exchange. MEPs are used within the preferred system to implement the protocols that support loose coupling of services and provide the basis for more complex message patterns than a simple request-response (e.g. forwarding, routing, asynchronous brokerage), and to allow for security-related checks to be performed at various points at the message exchange path.

The preferred embodiment also implements and expands features of web services security protocols such as the OASIS WS-Security specification. These concepts are Security Claim, Security Token, Security Token Service (STS), and Trust Realm. The security claim, security token, and security token services concepts are used within the preferred system to scope the group membership and to assert and limit the members' activities within the group. Additionally Policy Enforcement Point (PEP) and Policy Decision Point (PDP) aspects of access control, such as those used in IETF's (www.ietf.org) COPS and OASIS XACML specifications, are also used within the system to manage the security policy of a trust realm, and ensure that the policy is followed in the interactions among the services from different trust realms.

FIG. 1 is a schematic illustration of a network entity 10, such as a web service, and the associated resources and functions with which in interacts: namely Security Token Service 12, the Policy Decision Point 14, and the Policy Enforcement Point 16. As discussed above, the network entity is a computational service, which is accessible via messages of definite, programming-language-neutral and platform-neutral format, to provide a result or response. There is no special presumption that the results are used primarily for display by a user-agent. From the point of view of other services or users, the network entity is a collection of network endpoints, or ports, at which it can be accessed. The entity may broadly be defined by the following parameters:

1) Types: a container for data type definitions using some type system;
2) Message: an abstract, typed definition of the data being communicated to/from the entity;
3) Operation: an abstract description of an action supported by the entity;
4) Port Type: an abstract set of operations supported by one or more endpoints;
5) Binding: a concrete protocol and data format specification for a particular port type;
6) Port (interface): a single endpoint defined as a combination of a binding and a network address; and
7) Service: a collection of related endpoints.

The STS 12, PDP 14 and PEP 16, are examples of additional services that provide for secure message exchanges between entities. These are respectively configured to (a) issue, validate and exchange security related information such as security tokens, security assertions, credentials and security attributes; (b) correlate and transform such security related information; and, (c) make decisions on the basis of policies that use such security information in order to determine if an entity is authorised to be granted a request or to perform an action on a service or resource.

The Security Token Service (STS) 12 is a component that can issue, validate and/or exchange security tokens. A security token is a signed collection of claims, which is issued based on the set of claims provided by the entity wanting to use the token, the token owner for short, or by an authority acting on its behalf. The STS 12 may combine the provided claims into a specific token format, include any additional information such as the validity period, principal's and signing authority's details, and sign it.

Validation of a token primarily establishes the correctness of a token structure or signature, as well as time validity. Validation of a claim establishes the validity of the credentials relating to the claim. Depending on the type of acceptable tokens and claims, different functions may need to be implemented for validating tokens of a given type and for validating claims of a given type. Exchange of tokens is a derived functionality that combines validating one token and issuing another token in exchange. There is at least one STS associated with a trust realm, and several entities within the same realm may use the same STS The Policy Decision Point (PDP) 14 is a network node that makes decisions on the basis of already defined declarative security policies, set by the trust realm owner. In addition to the result of the decision, the PDP may require that the Policy Enforcement Point (PEP) 16 fulfils a number of obligations. This may be, for example, that the PEP shall keep some information for auditing, or that additional credentials are required in order to complete the decision.

The Policy Enforcement Point (PEP) 16 is any mechanism that enforces a (security) policy of a trust realm on a network entity. A PEP is deployed on behalf of a resource owner, service provider or user and typically will implement at least one of the following security roles:

1. A message inspector that checks the correctness of the message including validation of any tokens expressing security claims;
2. A message interceptor/security intermediary (actor)/gateway that provides the main point where processing and transformation of message content is performed and a policy decision is enforced; and
3. A Secure message router that manages secure and reliable message propagation to intermediaries and ensures that they will be able to process only the information portion/message segments that are necessary for their role, the rest of the message being made confidential.

Within a trust realm, a large number of PEPs interact with a smaller number of PDP/STS services. A single entity may be associated with a number of PEPs which will perform security enforcement actions as they intercept an incoming or outgoing message in a sequence. A PEP may use a number of STS and PDP services within the same trust realm in order to enact enforcement actions. Typically the choice of STS will depend on the type of token possessed or required, and the choice of PDP will depend on the type of action to be authorised. A PEP is associated with every service in the system, including the STS, PDP and PEP services, although these have been shown without in FIG. 1 for the sake of simplicity. Both incoming and outgoing messages may be intercepted by the PEP and a message may have to pass several PEPs during its way from the sender to the recipient.

Additionally, the preferred embodiment of the invention preferably implements and expands upon the features of coordination protocols such as the OASIS WS-Coordination specification. These concepts are: a coordination context, and activation and registration services; which are used in the preferred embodiment to provide correlation of an activity within a secure group.

Figure 2:
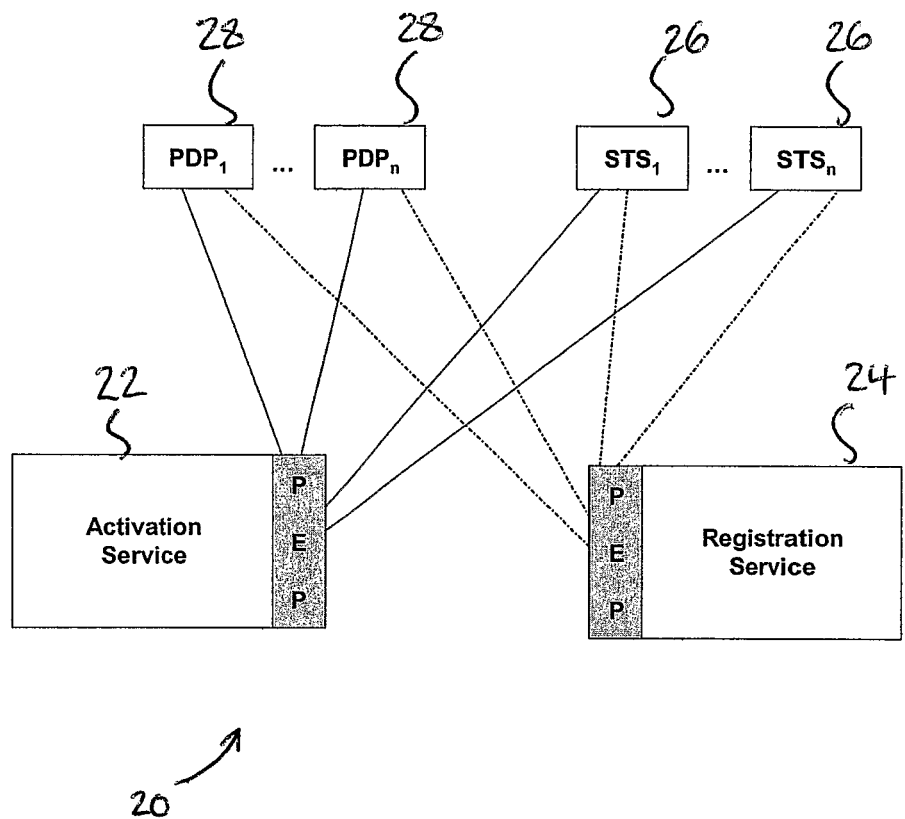
FIG. 2 is a schematic illustration of a coordination service for coordinating the operation of a plurality of network services cooperating in an activity.

FIG. 2 illustrates the basic elements of the coordination service 20, comprising Activation 22 and Registration service 24. The Activation service 22 provides an operation that enables an application or network entity to create a coordination instance or context. The coordination context is used to pass coordination information to parties involved in a coordinated or group activity, and is placed in messages that are exchanged by the parties in the group. The coordination context provides access to a coordination registration service 24, a coordination type, and relevant extensions.

The registration service 24 provides an operation that enables an application to register as a member of a group and to receive coordination protocols. These protocols are coordination type-specific and define the coordination behaviour, and the messages exchanged between the coordinator and a participant playing a specific role within a coordination type. The registration service used may be that of the first or original application or one that is specified by an interposing, trusted, coordinator.

Once a coordination context is acquired by a first application, it can be sent by appropriate means or message to a second application as an invitation to cooperate. The context contains the necessary information to register the second application against the group activity, and specifies the coordination behaviour that the second application will have to follow. In this manner an arbitrary collection of network services may coordinate their joint operation.

FIG. 2 also illustrates that the services of the coordination service may interact with an arbitrary number of different security services comprising STSs 26 and PDPs 28. Normally, different PDP and STS services are specialised for different coordination context types or transaction context types.

Figure 3:
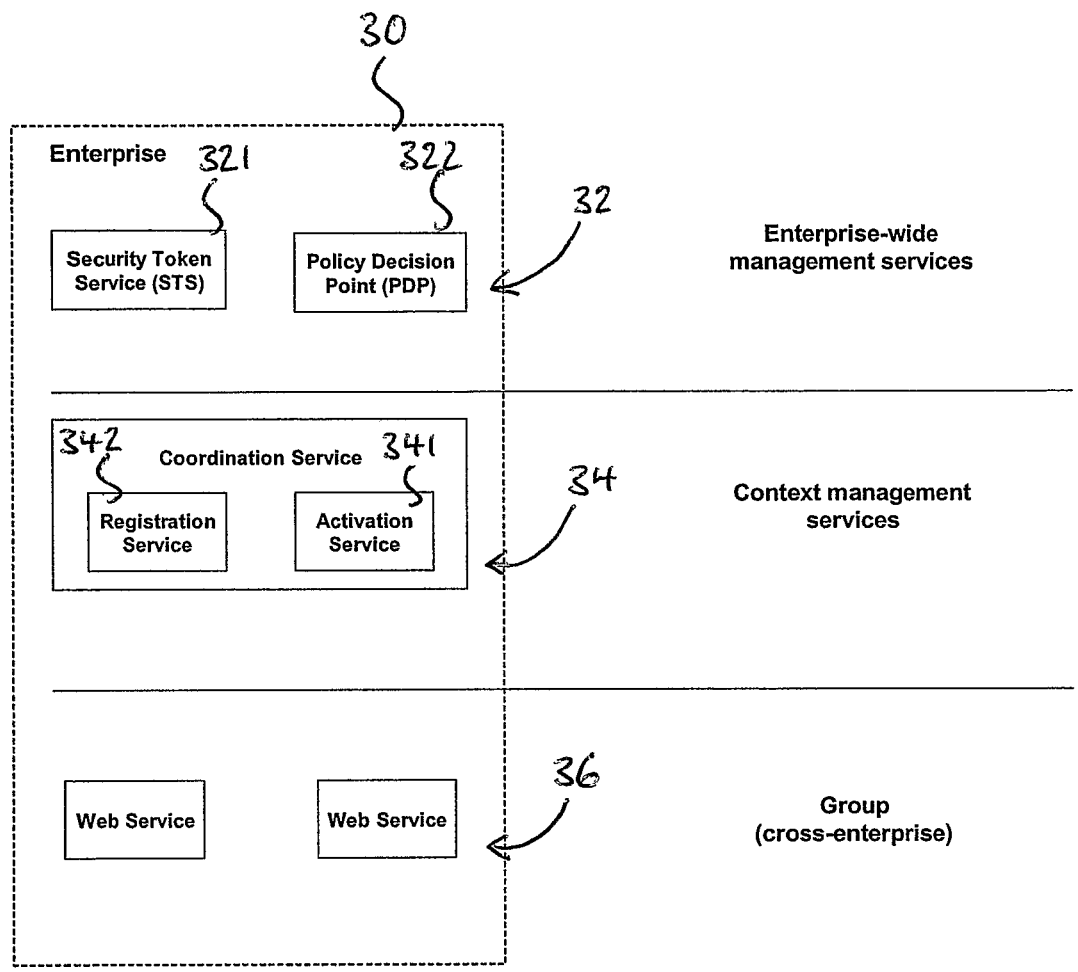
FIG. 3 is a schematic diagram of the different components utilised in the preferred embodiments of the invention.

Reference should now be made to FIG. 3, which illustrates the hierarchy of the functional components employed in the preferred embodiment of the invention. FIG. 3 illustrates an enterprise or trust realm 30 having three tiers of components: Enterprise-wide management services 32, Context Management services 34 and Group Services 36. The Group services are those that may collaborate with services from other Trust realms to form a group.

Enterprise-wide services 32, comprising STS 321 and PDP 322, are specific to a trust realm, and may interact with any other services from the enterprise. In addition, STS services can interact across trust realms in order to establish trust relationships (i.e. federation) required for operation of context-management and group services. The preferred embodiment relies on the existence of this basic trust relationship between STS components from different trust realms.

Context management services 34, comprising activation service 341 and registration service 342 which together form a coordination service, may also operate across trust realms, making use of the existing basic secure federation in order to reach a decision as to whether a service is entitled to enter the group. In practice, it is registration services that interact cross-realm, as typically only one activation service is used (from the realm of a network service initiating the group). The context management service 34 may be provided by a third party, following the establishment of the federation of realms that contribute network services to the group, and the realm of the third party provider.

Lastly, the group services 36 includes network services, preferably web services, that are brought together for the purpose of an activity as defined earlier. They are registered with a registration service, and own the appropriate context which enables them to prove their membership to the group.

Although, only one trust realm is shown in FIG. 3, the preferred embodiment of the invention relies on the interaction of a number of similar trust realms. Furthermore, FIG. 3 does not show the respective PEPs associated with each service. However, as described above, it will be appreciated that each network service is associated with a PEP (Policy Enforcement Point), which intercepts the messages being communicated to/from the service to maintain the security level associated with the service, and perform functions of message routing and delivery. In order to provide this, the PEP interacts with the PDP (Policy Decision Point) and STS (Secure Token Service) services. Preferably, the PEP implements at least roles 1 and 2 described above.

The preferred system and protocol advantageously provide a security context to expand on the functionality of the technologies discussed above and make secure group communication possible. The security context is the basic means for defining the scope of the group, and for providing a secure perimeter around the group members.

The security context comprises a collection of data elements that are specific to each group in which services are involved. The data elements preferably comprise elements purely for identifying purposes, such as a unique identifier for the group, and elements that have a protection function, namely security tokens and public/private keys. The security context therefore comprises a component that is public and a component that is private.

Although, a group member can freely pass the public component of the security context to a service that is invited to join the group, only those entities who possess both the pubic and the private security components of the information associated with the group context can actually participate within the group. As will be clear from the following description, one of the features of the preferred protocol is that the private component of the security context is only provided to an entity wishing to join the group after an additional security check with the registration service. In this way, it can be determined by the registration service of a trust realm whether a service that is invited to join the group satisfies local policy requirements before group membership is permitted. Services not fulfilling the policy can be refused group membership.

The public component of the security context preferably therefore includes:

1) A definition of the group, such as a group identifier in the form of a string. Any kind of string can be used for this purpose. However for network resources such as (Web services) it is recommended that a Universal Unique Identifier is used. The string may be encoded in any binary type of data, including text data such as ASCII, numerical data such as binary and hexadecimal.

2) A group security token and a public group key for securing interactions and access to the group, and for claiming the membership to the group. The public part of the security context may contain one or more security tokens and public keys, as will be clear from the following discussion. The number and structure of these depends on the number of trust realms contributing services to the group, and on the mode of the communication. The keys and security tokens are arbitrary in the sense that any unique key or token that can be communicated in an authorised manner from one entity to another can be used.

The descriptive definition of the group and the group token, in the form of a meta-data element, are preferably presented as a block in the SOAP message header, if SOAP is used, from any services that are group members. This enables entities that are not group members to obtain and confirm the group context (from the claims of the token), and indirectly provides them with the necessary information to apply for group membership. This is because the address of the registration server for group membership is preferably provided in the public component of the security context. Thus, the public component of the security context can be viewed as an invitation to join the group from a group member, providing the receiving entity is configured to respond by requesting group registration.

Alternatively, the security token and the public key could be held by a group member and passed to another service, when it is desired to invite that service into the group.

The private part of the security context is the group private key, which may be obtained from the appropriate registration service by an entity, once that entity has received the public part of the security context and therefore been 'invited' to join the group. Any messages between group members are preferably signed with the group private key, so that on receipt the group public key can be used by the receiving service to validate the transmitting service's membership of the group. Additionally, messages between services may be encoded or encrypted by the group public key, so that they are kept private from services that are not admitted to the group, and the private key may then be used to decrypt the messages received from a group member. Preferably, however, a separate group key is used for the encryption than is used for member validation. The separate key may be derived from the group public key, or separately generated, and transmitted with the public part of the security context. This measure reflects good security practice of having different keys for signature and encryption. A corresponding private decryption key may then also be necessary.

The use of the public and private keys, therefore ensure that the message has not been tampered with during transmission and that only the services admitted to the group are able to view it.

Additionally, the preferred system and protocol provide for security contexts which differ in the nature of the group tokens they contain. One arrangement is to have a group token which is unique for the group, and the other is to have a group token which is unique or personalised for the group participant. The two different uses of group tokens provide for two distinct communication models, which will be described later in connection with different trust realm scenarios.

Different parts of the security context may be created by different services in the system. In the preferred embodiment, the STS communicates with the coordination service 34 to create and issue the public and private keys and tokens for the group; the activation service 341 creates the descriptive definition of the group, and is also responsible for providing the finalised security context to the service participant which requests (or is appointed) to create a group. The registration service 342 is responsible for registering new network services as group participants, and additionally may pass the private key issued by the STS to a registered group member. The auxiliary services managing the secure context may operate within a single trust realm or across trust realms, making use of the existing basic secure federation. In the case where several coordination services are involved, the registration services are those interacting across trust realms.

The co-ordination service, and the PDP and STS, that operate in accordance with the invention can be thought of as forming a secure group managing service.

A number of different examples will now be described to illustrate the action of the preferred system and protocol. Two different embodiments are described respectively utilising group tokens that are identical for each member of the group, and a group token that is personalised for each member. Each embodiment is explained with respect to three different cases, depending on the number and affiliation of trust realms. In the cases of both embodiments, the group token always contains a Group identifier; but in the cases described in the second embodiment the group token furthermore always contains an identifier that uniquely distinguishes each member of the group. The validity of the identifier is bound to the validity of the group key and the validity of the identity token of that member, and may include combining the information of interest from these two tokens into a single token, containing the member's ID. In the last two cases described in the second embodiment, the group token may contain a member's trust realm identifier. Furthermore, in all but the first case of both the first and second embodiments, the group token may contain a federation identifier. In all cases, the group token may contain auxiliary information about the state of a collaborative activity.

In the following examples, every entity is taken to own an encryption/decryption key pair (Pr/Pu), where Pr is a private key and Pu is a public key. As an example, the key pair of the web service 1 (ws1) is Prws1/Puws1. Every entity also owns an identity token T, provided by the environment or trust realm they reside in. In the description below, the activation and registration services are referred to as components of the coordination service for the sake of brevity, but preferably they are separate functionally and therefore have different identity tokens: Ta and Tr. The tokens are therefore referred to as Tws1 or Tws2 for web services ws1 and ws2; Ta for the activation service; Tr for the registration service; and Tsts for the STS. The tokens, in conjunction with the public and private keys allow an entity to vouch for its identity to a third party, such as another service.

These tokens are then signed by a private key of the STS (Prsts): /signPrsts. Each token contains at least the owner's ID, public key (Pu), and optional information that may refer to the capabilities of the owner, and is attached to each message issued by an entity so that the entity can authenticate itself as a legitimate requester at the destination. For example, Tws1=(WS1_ID, Puws1, capability info, . . . )signPrsts. The STS signing the identity tokens may be different from the one involved in the creation of the security context, as will be explained later.

In addition, the following description of the security protocol focuses only on the security mechanism used to protect creation and propagation of the security context, and subsequent use of the context to protect the message exchange between the group participants. The standard ways of applying security mechanisms (e.g. encryption, signature) for protecting message exchange in a distributed system may be applied as needed. If these mechanisms are correctly applied to the full message (i.e. after performing the functions of the methods for sharing security context), it will not impact the security-context sharing protocol that is described below, or the functioning of the system described in this invention.

In the subsequent cases and system diagrams, the PDP and STS appear where their functionalities are relevant for interactions that have to do with the security context creation and context binding (registration). These include security checks on who is allowed to create or join a context, or bind to an existing context. It will be appreciated that the STS and PDP will also be used in accordance with their other normal functions, such as verification of the identity of individual services, however this description is omitted to avoid obscuring the discussion of the preferred embodiments.

First Embodiment

In this embodiment, the group token is configured so that it does not contain the owner's ID.

First Case

Figure 4:
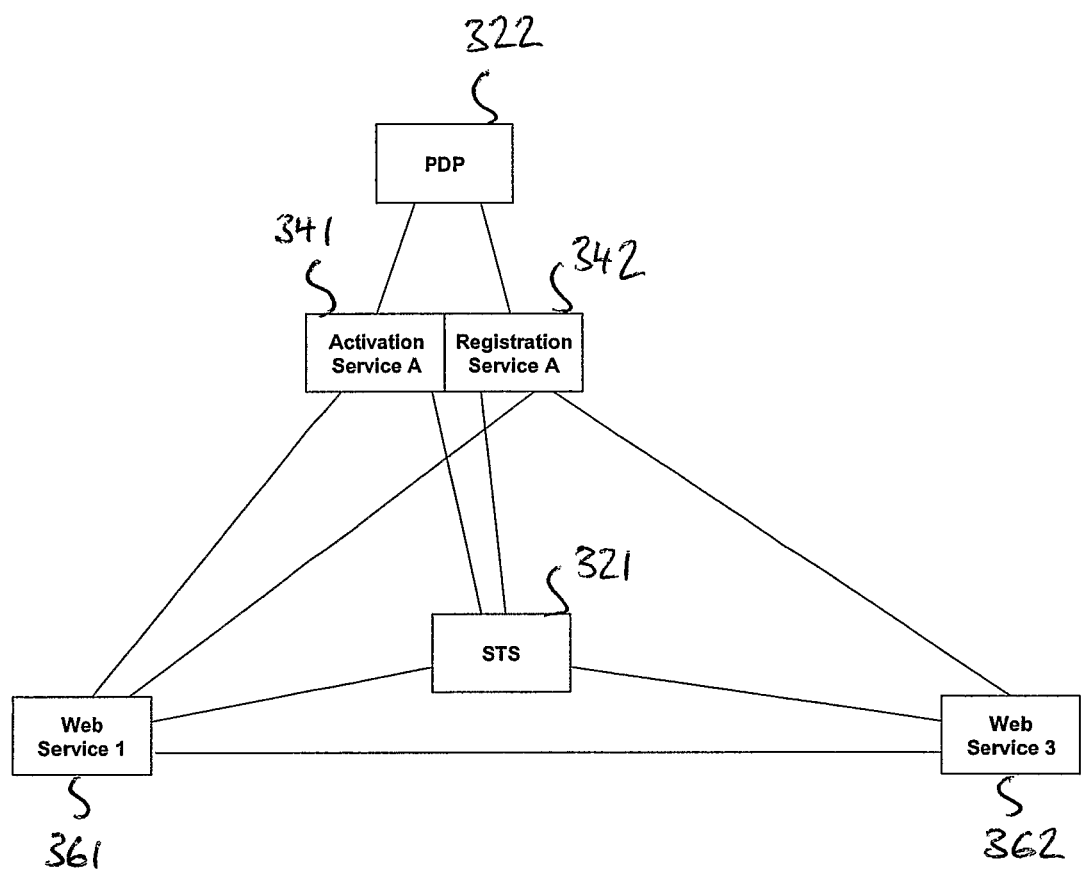
FIG. 4 is a schematic diagram of the components and relationships between components in a first case.

FIG. 4 shows the relationships between the components of FIG. 3, for the simple case in which there is only a single trust realm. Web services 361 and 362 (having PEPs that are not shown) communicate with STS 621 and receive security tokens comprising their unique ID and Public Key. Web Service 1 is the initiator of the group and so communicates with Activation service 341 and Registration service 342. Web Service 2 is the service invited into the group by Web Service 1, and therefore only communicates with Registration Service 342. Both Activation and Registration Service communicate with PDP 322, which implements security policy against entities entering the group.

Figure 5:
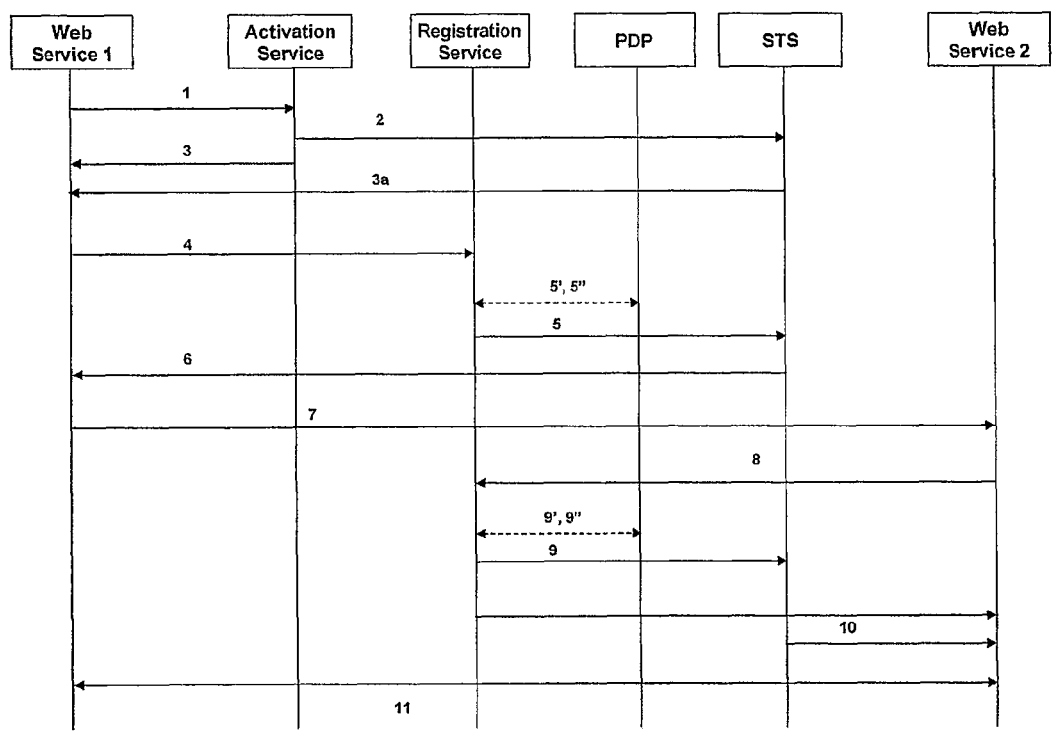
FIG. 5 is an operations flow chart illustrating the messages exchanged in a first example of the first embodiment.

FIG. 5 illustrates in more detail the messaging protocol.

In Step 1, WS1 requests group activation, by sending a message to the activation component 341 of the coordination service. The identity token of WS1, signed with the Private Key of WS1, is provided to authenticate itself at the activation service:

message 1={request, Tws1}/signPrws1

Step 2: The activation service creates the descriptive part of the security context for the group (GC), containing a unique identifier for the new group. The Activation service communicates via message 2 with the STS 321, which in turn issues the remainder of the security context, namely: a group key pair for the group (Prg/Pug) and a group token (Tg). The token contains the groupID and the group public key, and does not contain any personalised private information (i.e. service-specific). The group token can only be created once, at the group activation:

message 2={GroupID, TokenCreateRequest, Tws1}signPra

Tg= {GroupID, Pug, . . . }/signPrsts

Step 3: The activation service returns the GC and the address of the registration service to the originating service WS1:

message 3={GC, RegAdr}signPra

Step 3*a*: The STS returns the GC and the signed Group token Tg, to the WS1:

message 3*a*={Tg}/signPrsts

Step 4: Service WS1 requests that the registration service register service WS1 against the security context GC to establish it as a participant of the group.

message 4={request, GC, Tg, Tws1}signWS1

Step 5: The registration service 342 performs a security check on service WS1 by means of the responsible STS and PDP services to check that it is an authorised service for the trust realm, presenting the identity token of WS1. If it is, then the registration service communicates with the STS 321 and requests the Group Private Key Prg be delivered to the service WS1:

message 5'={AuthorisationRequest, Tws1}signPrr
message 5"={AuthorisationResponse}signPrpdp
message 5={GC, Tg, PrgkeyDeliverRequest, Tws1}signPrr Additionally, the registration server creates a record of the group membership. At this moment in time, the group membership indicates that the group has only one member, Web Service 1.

Step 6: The STS returns the Group Private Key Prg encrypted with the public key of the ws1:

message 6={{Prg}/encPuws1}/signPrsts

This may be received directly from the STS, or received from the STS via the Registration Server. The Web Service WS1 now has full group membership, as it has received the Group Token containing the Group ID, and Public Key, as well as the Private Key from the Registration Service. The Web Service now invites the second Web Service to join the group.

Step 7: This is an application message which WS1 uses to pass the descriptive part of the context (GC), the group token, the address of the Registration Service, and a challenge or assertion, to WS2:

message 7={{WS2_ID}/signPrg, GC, RegAdr, Tg, Tws1}/signPrws1

The challenge or assertion is used to confirm that a new member (WS2) is invited to join the group by an already registered and therefore authorised group member.

The challenge or assertion consists of WS2 specific information, which uniquely identifies WS2: it can be the identity information, or the public key of WS2 from Tws2 for example, or any other form of unique identifier, and it is signed with the group private key:

{WS2_ID}/signPrg

This WS2 specific information is publicly known, such as by being embedded in the identity token of WS2, and is also provided to the registration service on request, such as when the identity token of WS2 (Tgws2) is presented at the registration request, as shown in message 8).

Because the challenge is signed with the private key of the group, it confirms that it originates only from already registered member. Because it contains a WS2 identifier, it explicitly states which new service has been invited to the group by the existing (trusted) member. This prevents a man-in-the-middle attack on the protocol: for example, a third service may intercept the communication between WS1 and WS2 and obtain the public part of the security context wishing to register to the group. This will not be possible because the challenge contains WS2, specific identifier, which is validated at the following step 8.

Step 8: The Web Service 2 receives the public part of the security context and responds with a registration request to the registration service component of the coordination service, so that it may become a member of the group:

message 8={request, {WS2_ID}/signPrg, GC, Tg, Tws2}/signPrws2

Step 9: The registration service checks with the STS and PDP that Web Service 2 is authorised to join the group, and if so, updates the record of the group membership to include WS2 as a member. The registration service communicates with the STS to pass the private key of the group Prg to WS2.

message 9'={AuthorisationRequest, Tws2}signPrr
message 9"={AuthorisationResponse, Tws2}signPrpdp
message 9={GC, Tg, PrgkeyDeliverRequest, Tws2}signPrr Step 10: The STS issues the private group key either directly to WS2 or via the registration service. The Prg is encrypted with the public key of the ws2:

message 10={{Prg}/encPuws2}/signPrsts

WS2 is now a member of the group, and in Step 11 group communication may occur at the application-level between group participants, protected with the security context. That is the communication will include application data encoded with the Group Public key, or preferably a separate or derived key securely exchanged within the security context, and signed with the Group private key:

message 11={{data}/encPug*}/signPrg

The public key, or the separate encryption key, is shown in the above message as Pug*.

Second Case

Figure 6:
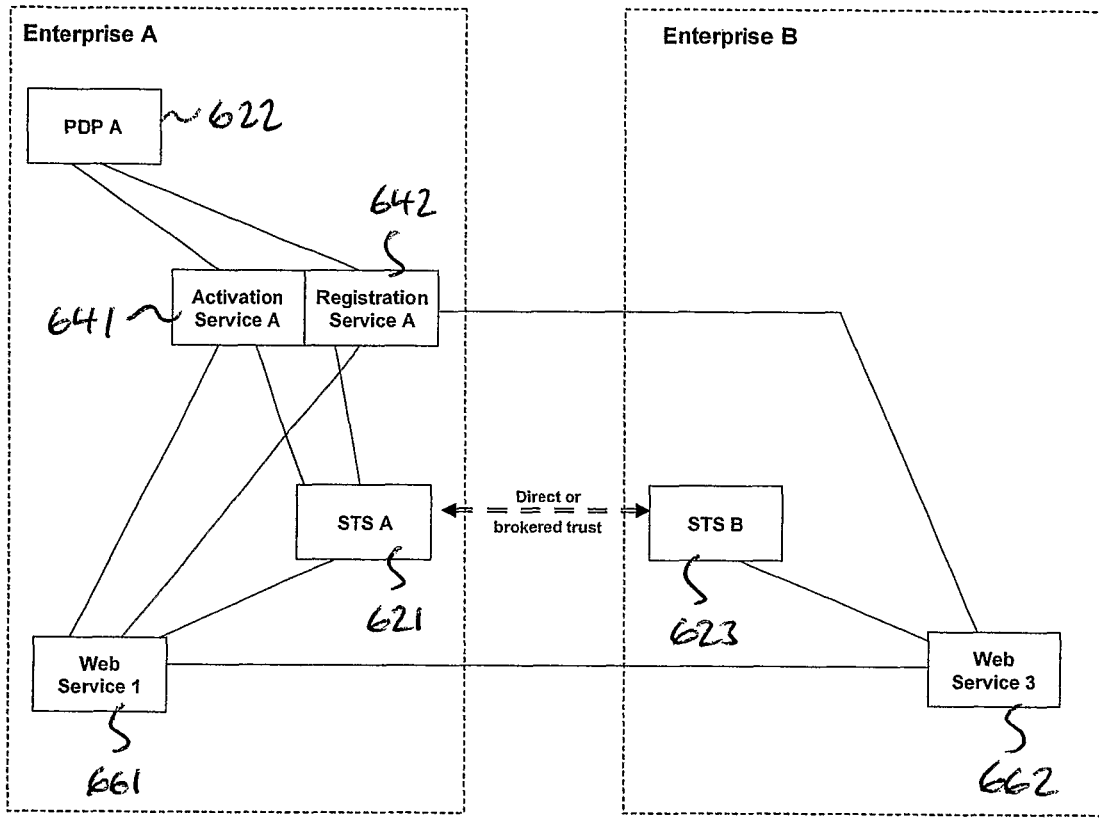
FIG. 6 is a schematic diagram of the components and relationships between components in a second case.
Figure 7:
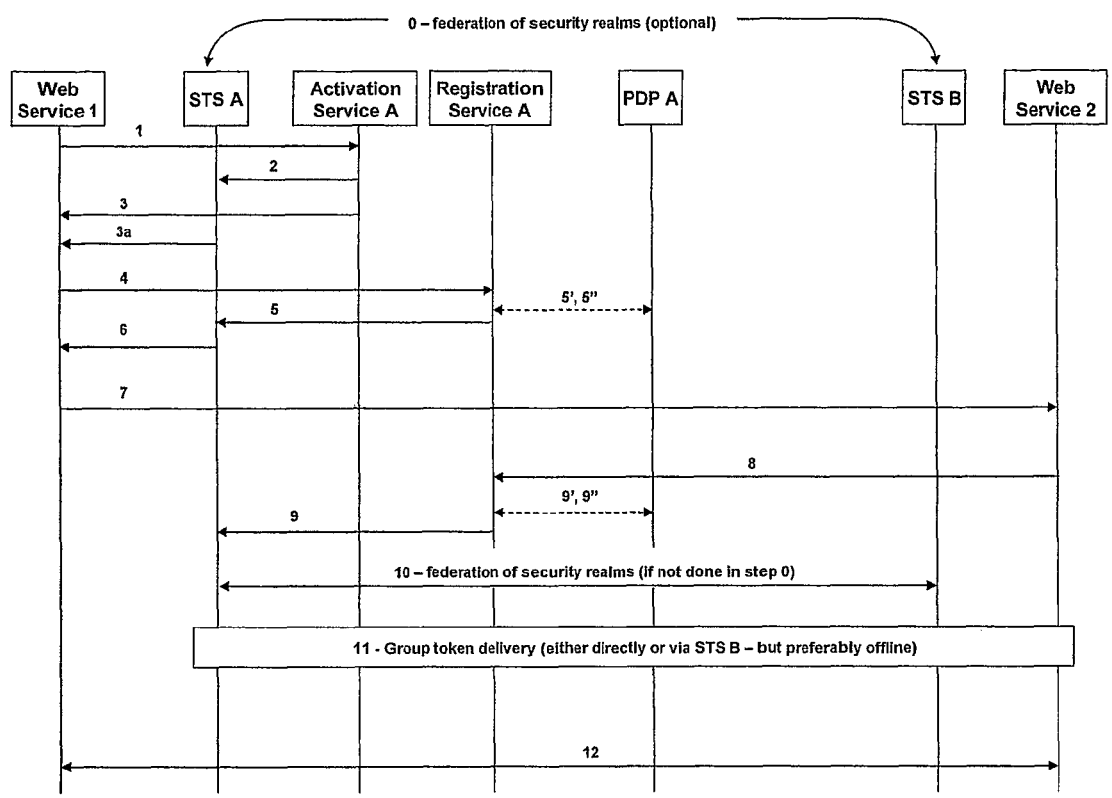
FIG. 7 is an operations flow chart illustrating the messages exchanged in a second example of the first embodiment.

FIG. 6 shows the more complicated case in which the group is to comprise services from different enterprises or trust realms. This arrangement assumes that there is already a direct or brokered trust relationship between the STS components of the first and second realms. This means that two STSs are able to evaluate tokens issued by each other and inform each other if a token has been revoked. A discussion of how this occurs is outside of the scope of this discussion, but is known to the skilled man.

As before, first trust realm 62 contains web service 1 (WS1) 661 as well as STS A 621, Activation Service A 641, Registration Service A 642, and PDP A 622. In addition, a second trust realm 64 is shown in which Web Service 2 (WS2) 662, STS B 623 are disposed. The second realm may also comprise its own Activation and Registration Service, although these are not shown in the drawing. Also, as before, group token does not contain owner's ID The relationships between the components are identical to those shown in FIG. 5, except that WS2 now communicates with the STS B 623 (or the STS A 621—see below). The relationship between STS A 621 and STS B 623 exists as a result of the assumed federation of trust realms.

FIG. 6 illustrates the interactions between the different components of the system.

Step 0 represents the federation of security realms (beyond the scope of this discussion), which can happen at this point, or later at step 10.

Firstly, Web Service 1 obtains a Security Context and establishes a group with itself as participant in the manner described above with reference to FIG. 5. Steps 1 to 6 are identical except that the STS A 621 and Activation and Registration Services A particular to the first realm are used. In the same way as before, WS1 obtains the Group Identifier, the Group token, and the address of Registration Service A, and in Step 7 passes these to the second Web Service WS2 in the second realm, as an invitation to join the group.

message 7={{WS2_ID}/signPrg, GC, RegAdr, Tg, Tws1}/signPrws1

In Step 8, Web Service 2 sends a registration request to the Registration Service A component of the coordination service, so that it may become a member of the group.

message 8={request, {WS2_ID}/signPrg, GC, Tg, Tws2}/signPrws2

In Step 9, the Registration Server communicates with the PDP B to verify that WS2 is authorised to join the group. If it is authorised, then the Registration service A communicates with STS A 621 to pass the private key of the group to the WS2:

message 9={GC, Tg, PrgkeyDeliverRequest, Tws2}signPrr

At this point, if not already completed in step 0, then federation between realms A and B needs to be established in step 10. This is a requirement in order to provide delivery of the group private key to the WS2. This interaction is possible because any token owned by an entity from realm B is signed by STS B, so STS A and STS B are able to locate each other.

In the case of cross-realm security context propagation the group token and the group keys need to be securely delivered to the new participant. The assumption is that STS A creates the group token Tg, and WS2 joining the group is in the trust realm of the STS B. This exchange needs to happen out of band.

Figure 8:
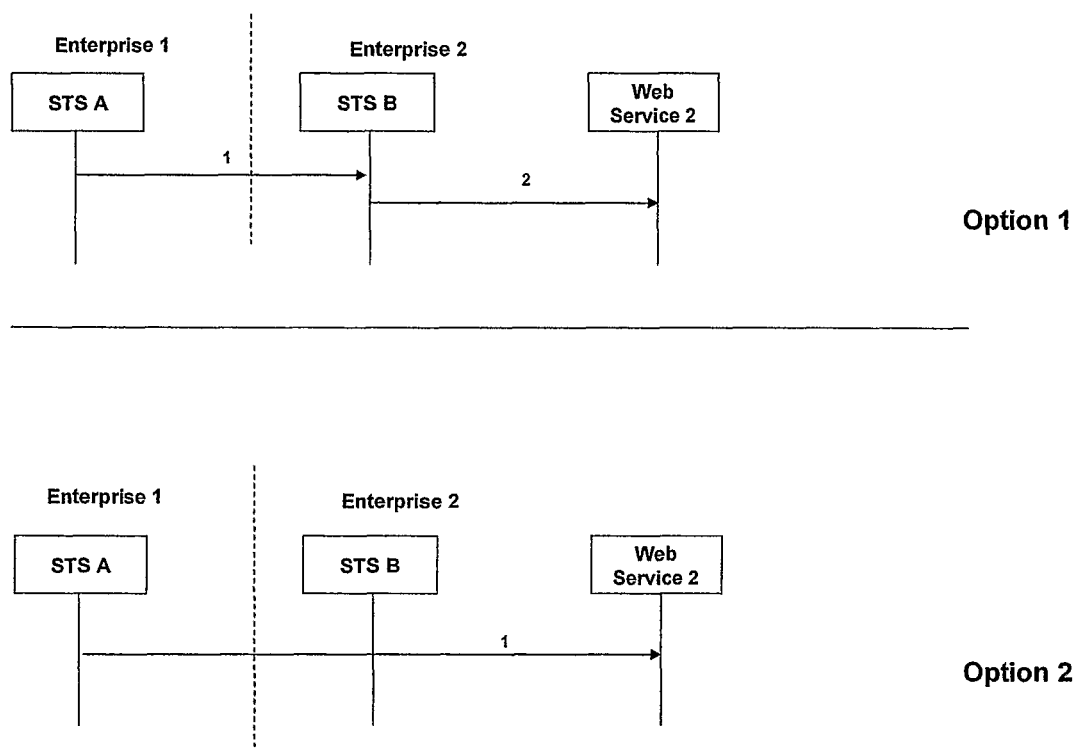
FIG. 8 is a schematic illustration of cross-realm propagation of the group token and private key for the group.

The exchange can happen in one of two ways, as illustrated in FIG. 8. The two options rely on different types of federation establishment, both of which are documented in WS-Federation standard. It is assumed that at this point the federation between realms A and B exists, and that STS, A and STS B have exchanged their tokens.

In option 1, STS A transmits the group token Tg and the Group Private key Prg to WS2 via the STS B. Alternatively, the STS B could have already acquired the Prg. In option 2, the STS A directly delivers Tg and Prg to the WS2. This interaction may assume the preceding interactions when some additional token validation is performed by STS A, or when some additional credentials are issued by STS B to WS2 that entitles it to interact with STS A.

Step 11 represents delivery of the group token Tg from STS A to WS2, in the case where it is delivered directly or via STS B, see FIG. 8. If done via STS B, the group token may be co-signed by STS B if required as a proof of authorisation. For the first option, it is assumed that the federation between realms A and B exists, and that STS A and STS B have exchanged their tokens. Step 11 is implemented as follows:

In step 11.1: STS A forwards the group private key (encrypted by Pu of WS2) to STS B, and signs the message:

message 11.1={{Prg}/encPuws2}/signPrstsa

In step 11.2: STS B forwards the group private key to WS2, and signs the message (because there is no federation between STS A and WS2):

message 11.2 {{Prg}/encPuws2}/signPrstsb

In Option 2, it is also assumed that the federation between realms A and B exists, and that STS A and STS B have exchanged their tokens. However, it is also assumed that (as a part of the federating process) WS2 can recognize and trust STS A:

Step 11.1: STS A sends the group private key (encrypted by Pu of WS2) directly to WS2, and signs the message:

message 11.1={{Prg}/encPuws2}/signPrstsa

This may be done offline if desired.

Following the receipt of the Group Token and the Group Private Key, group communication at the application-level between group participants, may then proceed in step 12, protected with the security context:

message 12={{data}/encPug*}/signPrg

Third Case

Figure 9:
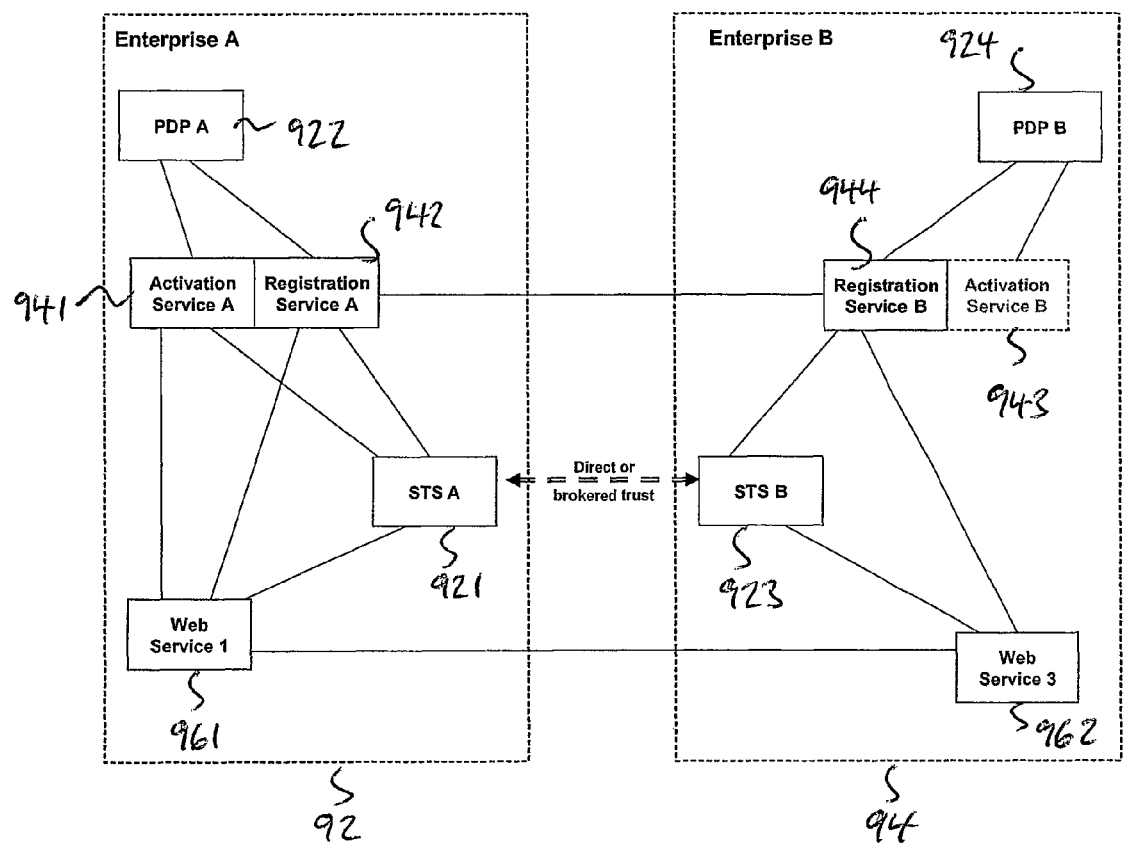
FIG. 9 is a schematic diagram of the components and relationships between components in a third case.

FIG. 9 shows a further complicated case in which the group is to comprise services from different enterprises or trust realms, and the separate trust realms comprise respective Coordination Services that are to be used to manage the group. This arrangement assumes that there is already a direct or brokered trust relationship between the STS components of the first and second realms. A discussion of how this occurs is outside of the scope of this discussion, but is known to the skilled man.

This scenario presents the use of interposed coordination services in the WS-Coordination standard: if two applications wish to use different coordinators, the activation service of the second coordination service keeps the same coordination context identifier (in our case GC), but augments it with the address of the second registration Service, in addition to the address of the first Registration service.

As before, first trust realm 92 contains web service 1 (WS1) 961 as well as STS A 921, Activation Service A 941, Registration Service A 942, and PDP A 922. In addition, a second trust realm 94 is shown in which Web Service 2 (WS2) 961, STS B 9230, Activation Service B 943, Registration Service B 944 and PDP B 924 are disposed. Also, as before, the group token does not contain owner's ID The relationships between the components are identical to those shown in FIG. 5, except that WS2 now communicates with the STS B 924 (or the STS A 622), and the Registration Service B 921. Registration Service B is configured to communicate with Registration Service A 942, the PDP B 924 and the Web Service 2 962.

Figure 10:
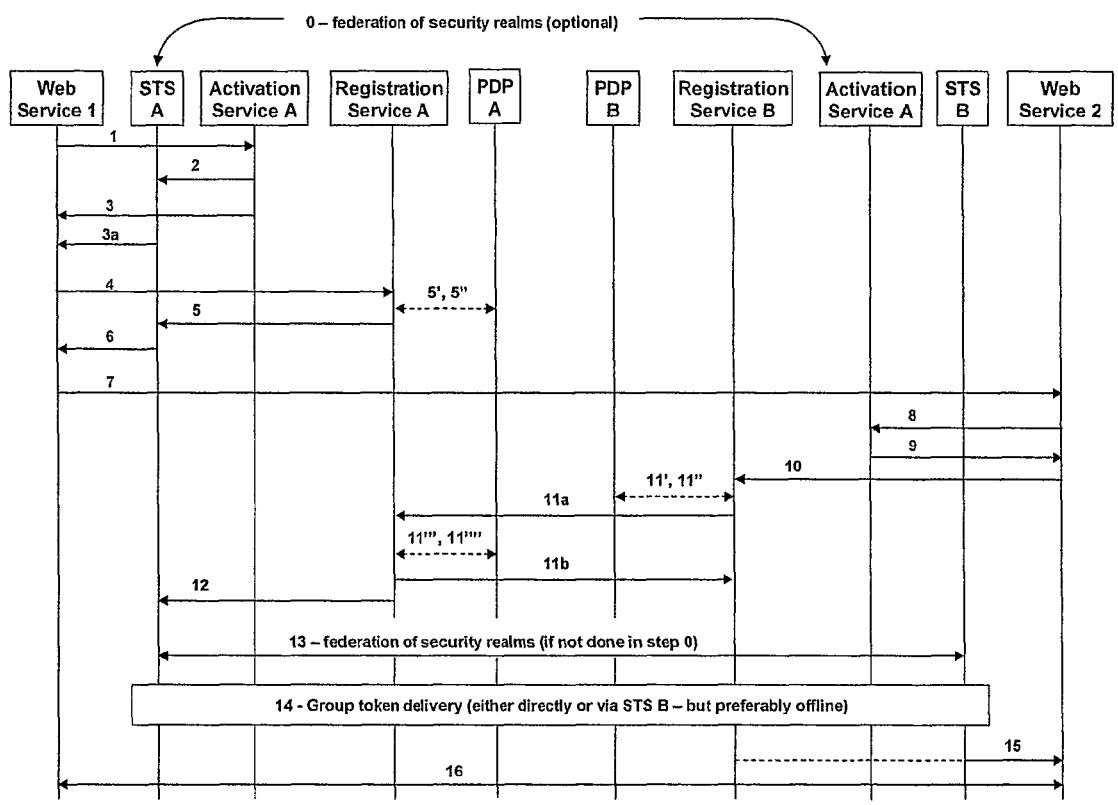
FIG. 10 is an operations flow chart illustrating the messages exchanged in a third example of the first embodiment.

Referring now to FIG. 10, the interaction between the components will be described in more detail. As before, in Step 0, federation of security realms may occur. In Steps 1 to 6, Web Service 1 obtains the Security Context and Group Token, and registers itself as a member of the group as before.

In Step 7, WS1 sends an application message to WS2 to pass the descriptive part of the context (GC) and the address of the Registration Service A to the WS2.

message 7={{WS2_ID}/signPrg, GC, RegAdrA, Tg, Tws1}/signPrws1

In Step 8, and 9, as WS2 is configured to use a different coordination service, it sends request to the activation service B. This is different from the initial message 1 for WS1, as it contains the group context GC, created by Activation Service A and received from WS1. Activation service B returns the same GC, and provides the addresses for registration service A and B.

message 8={request, {WS2_ID}/signPrg, GC, Tws2}/signPrws2 message 9={GC, RegAdrA, RegAdrB}signPrab

There is no need for Activation Service B 943 to contact the STS B 923 at this stage (such as in message 2), since the group token Tg already exists, and has been received by WS2 in the application message from WS1.

In Step 10, WS2 issues a registration request to the registration service B 944, transmitting the address of registration service A:

message 10={request, GC, RegAdrA, Tg, Tws2}/signPrws2

In step 11, the registration service B communicates with the PDP B to verify that WS2 is authorised to join the group:

message 11' {AuthorisationRequest, Tws2}signPrrb message 11" {AuthorisationResponse}signPrpdpb If WS2 is authorised, then registration service B requests registration with registration service A as interposed, on behalf of the service WS2:

message 11a={request, GC, Tg, Tws2, Trb}/signPrrb

Upon receipt of this message, the registration service A communicates with the PDP A to verify that it can accept the proposed registration:

message 11'''={AuthorisationRequest, Tws2}signPrra message 11''''={AuthorisationRequest, Trb}signPrpdpa If there is a requirement to additionally guarantee the integrity and non-repudiation of the interactions between WS2 and registration service B (i.e. between a participant of the interposed registration service and the interposed registration service), then the original message 10 is preferably co-signed by registration service B, in order to form message 11b:

message 11b={message 10}/signPrrb

In Step 12, registration service A communicates with the STS A 921 to pass the private key of the group to WS2:

message 12={GC, Tg, PrgkeyDeliverRequest, Tws2}signPrra

If not completed in step 0, federation between realms A and B needs to be established at this point in step 13, as federation is a requirement in order to provide delivery of the group private key to the WS2. This interaction is possible because any token owned by an entity from realm B is signed by STS B, so STS A and STS B are able to locate each other.

In Step 14, the group token and the private key for the group (Prg) are delivered from STS A to STS B where they are securely stored. This may be done offline. One possible format for a message 14 from STS A to STS B is:

message 14={{Prg}/encPustsb, Tg}/signPrstsa

At this stage, the group token may be co-signed by STS B if required as a proof of authorisation.

In Step 15, the token and group private key are delivered to WS2, which is now a member of the group.

message 15={{Prg}/encPustsb, Tg}/signPrstsb

At step 16, group communication at the application-level between the group participants can occur, protected with the security context:

message 16={{data}/encPug*}/signPrg

When interposed coordinators are used as above, the interaction between the two registration services A and B via message 11 only needs occur when the first service from realm B 94 wants to join the group. After this, the descriptive part of the context (GC) is localised at Registration Service B, and registration service B maintains a local record of group members. This is consistent with the use of interposed coordinators in the WS-Coordination standard. In order to allow for this for the security part of the context, the group token and the private key transfer take place between the two STS services A and B.

For example, if another service WS2' from realm B wants subsequently to join the group, this part of the protocol would only need to be carried out with respect to Registration Service B. Thus messages 8 and 9 (contacting the activation service B) are not necessary, and messages 10 to 16 are substituted for the part of the protocol similar to the messages 8 to 11 in the first case.

In the case of WS2', registration service B already possesses GC, and STS B already possesses Tg and Prg, when a message 10 is received from WS2' at the registration service. Messages 11, 12, 13 and 14 are not necessary for WS2' as these are used to update the Registration Service B and the STS B. Thus, the next step is step 15.

In Step 15.1, after performing a security check on the WS2' at the responsible STS and PDP services, the Registration service B 944 registers WS2' as a member of the group and communicates with the STS B 923, requesting that it deliver the group private key Prg to the service WS2':

message 15.1={GC, Tg, PrgkeyDeliverRequest, Tws2'}signPrrb

In step 15.2, the STS B returns the group private key Prg, either directly or via the registration service, encrypted with the public key of the WS2':

message 15.2={{Prg}/encPuws2'}/signPrstsb

The Web Service 2' is then a full participant of the group.

In the above described three cases, the anonymity of group members can be maintained, if the original tokens of the web services are never disclosed in application-messages. In that case:

message 7={{WS2_ID}/signPrg, GC, Tg}/signPrg

The advantage provided by this protocol for secure group communication, lies in the exchange of a group token: since Tg does not contain identifying information of the individual web services, it is a single unique groupID. It is therefore easy to re-issue it, if needed such as to extend time validity, and introduces less overhead in terms of processing and transmission loads, as Tg is created only once at the group activation and only propagated on a new member applying to join the group.

However, this protocol makes excluding a particular member from the group more laborious. First, the member to be excluded must be discovered, and this can be difficult, especially if anonymity feature is used, as the same group token is used by each member; after that, the absolute group token Tg will be revoked, as it is unique for all members, and is therefore no longer valid; lastly, pair-wise re-keying of the remaining group members is necessary, and the issue of a new group token.

Second Embodiment

The second preferred embodiment of the invention therefore provides for a second secure group protocol in which the group token contains the owner's ID. This will be discussed presented by means of fourth to sixth cases which mirror the three cases described above Fourth Case In the fourth case, it is assumed that the group is being established using services from a single trust realm or enterprise. The components and their relationships are therefore shown in FIG. 4.

Figure 11:
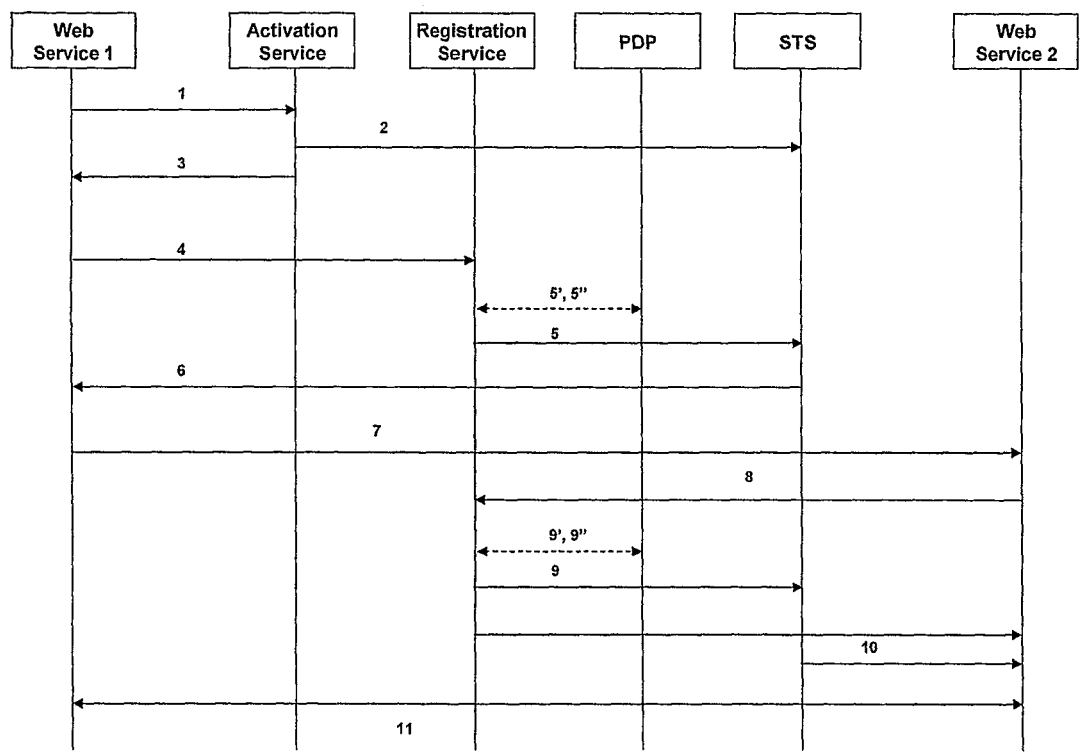
FIG. 11 is an operations flow chart illustrating the messages exchanged in a first example of the second embodiment.

The relationship between the components, illustrating the differences between the protocol of the fourth case and that of the first will now be explained in more detail with respect to FIG. 11. In this case, the group token includes an identifier of the group participant, such as Web service ID:

In step 1, WS1 requests group activation, by sending a message to the activation component of the coordination service as before. The identity token of WS1 is provided to authenticate itself at the activation service:

message 1={request, Tws1}/signPrws1

In step 2, the activation service creates a group identifier or descriptive part (GC) of the security context for the group, and passes it to the web service 1. Also, the activation service communicates with the STS, which creates a group key pair for this context (Prg/Pug). However, in this case, the group token Tg is not created at this step:

message 2={GroupID, KeyPairCreateRequest, Tws1}signPra

In step 3, the activation service returns the group identifier GC, and the address of the Registration service to the service:

message 3={GC, RegAdr}signPra

In step 4, the service WS1 requests registration with the context, that is participation in the group, from the Registration service:

message 4={request, GC, Tws1}signWS1

In step 5, the registration service performs a security check on the WS1 at the responsible STS and PDP services by presenting the identity token of WS1, and communicates with the STS, requesting creation of the group token for WS1 (Tgws1) and delivery of a group token and Prg to the service WS1:

message 5'={AuthorisationRequest, Tws1}signPrr
message 5"={AuthorisationResponse}signPrpdp
message 5={GC, TokenCreateRequest, Tws1}signPrr
Tgws1={GroupID, Pug, IDws1, . . . }/signPrsts Note that in this case the group token contains an identifier of the service that is successfully registered with the group, as well as the public key.

In step 6, the STS returns either directly or via registration service, Tgws1 signed and Prg encrypted with the public key of the ws1:

message 6={{Prg}/encPuws1, Tgws1}/signPrsts

Thus, the web service 1 only receives a personalised group token after applying to register with the registration service, rather than earlier in step 3a from the STS. The web service is now a full member of the group, and in step 7, can transmit an application message to a second web service to invite it to join the group. The message passes the descriptive part of the context (GC), the personalised group token to the WS2, and the address of the Registration service. There is no need to pass identity token of WS1 as with the first case, as now that the group token is bound to the identity information of WS1 (eg: Tgws1), WS2 has means to identify WS1 even if the original Tws1 token is not present:

message 7={{WS2_ID}/signPrg, GC, RegAdr, Tgws1}/signPrg

The second web service WS2 having received the message in step 7, can now register with the group in much the same way. Steps 8 to 10 for WS2 therefore correspond to the steps 4 to 6 above for WS1.

In step 8, WS2 contacts the registration service and provides the Group Identifier GC, and the challenge or assertion {WS2_ID}/signPrg.

message 8={request, GC, {WS2_ID}/signPrg, Tws2}signWS2

The registration server in steps 9', and 9", performs the necessary checks with the STS and PDP, and if okay, records WS2 as a member of the group.

message 9'={AuthorisationRequest, Tws2}signPrr
message 9"={AuthorisationResponse}signPrpdp
message 9={GC, TokenCreateRequest, Tws2}signPrr It requests in step 9 that the STS creates another token for the same group, but this time for the service WS2 (denoted as Tgws2). The format of the token is:

Tgws2={GroupID, Pug, IDws2, . . . }/signPrsts

In step 10, the group token for WS2 is delivered.

message 10={{Prg}/encPuws2, Tgws2}/signPrsts

Having received the personalised group token for WS2, and the group private key, group communication at the application-level between the group participants, can then occur protected with the security context. Each message will include the respective group token for that service, allowing for peer authentication:

message 11={{data}/encPug*, Tgws1}/signPrg

Fifth Case

The fifth case assumes that there are two trust realms, and services operate from different trust realms as participants in the group. The components and their relationships are therefore shown in FIG. 6.

Figure 12:
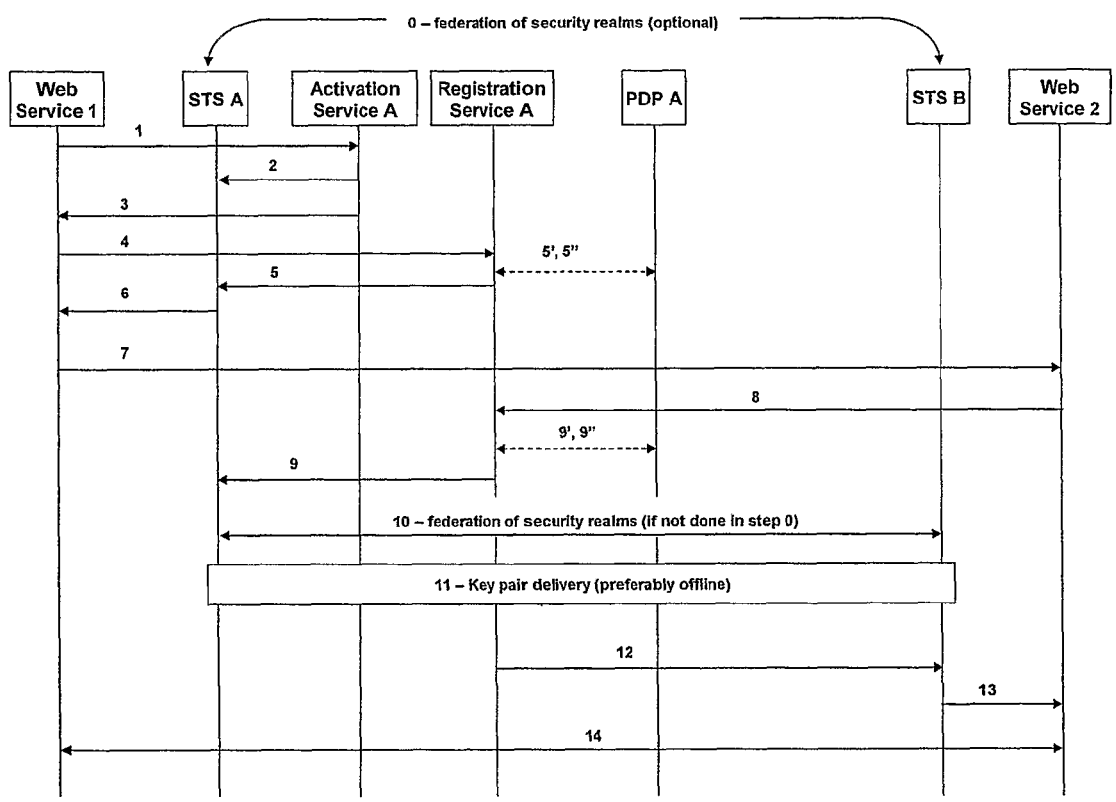
FIG. 12 is an operations flow chart illustrating the messages exchanged in the second example of the second embodiment.

The relationship between the components, illustrating the differences between the protocol of the fifth case and that of the fourth will now be explained in more detail with respect to FIG. 12. In this case, the group token includes an identifier of the group participant, such as Web service ID:

Steps 1 to 6 for WS1 to establish the group and to register as a participant are the same as for the fourth case, except that WS1 communicates with STS A. As before in step 7, WS1 transmits the descriptive part of the context, its personalised group token, and the address of the registration service to WS2. There is no need for WS1 to pass the identity token of WS1.

message 7={{WS2_ID}/signPrg, GC, RegAdr, Tgws1}/signPrg

In step 8, WS2 transmits its registration request to the registration service A:

message 8={request, {WS2_ID}/signPrg, GC, Tws2}/signPrws2

In step 9, the registration service communicates with the PDP A to verify that WS2 is authorised to join the group:

message 9'={AuthorisationRequest, Tws2}signPrr
message 9"={AuthorisationResponse,}signPrpdpa If it is authorised, then the registration service A communicates with the STS A 621 to pass the private key of the group to the WS2:

message 9={GC, KeypairDeliverRequest, Tws2}signPrr

If federation between the two realms has not been completed prior to this step, federation between realms A and B needs to be established in step 10, to ensure that STS A can transmit the personalised group token to WS2.

Thus, in step 11, the key pair for the group is delivered from STS A to STS B; it is stored at STS B to be used as a part of the group token for every service from trust realm B that needs to join the group.

In step 12, after performing a security check on WS2 at the responsible STS and PDP services, the registration service communicates with the STS B, requesting creation of the group token for WS2 (Tgws2) and delivery of Tgws2 and Prg to the service WS2:

message 12={GC, TokenCreateRequest, Tws2}signPrr
Tgws2={GroupID, Pug, IDws2, . . . }/signPrstsb In step 13, the STS B signs and returns the personalised group token Tgws2 and the private key Prg encrypted with the public key of the WS2:

message 13={{Prg}/encPuws2, Tgws2}/signPrstsb

At this point WS2, is a full group member and group communication at the application-level can occur between group participants, protected with the security context. Each message also includes the corresponding group token, allowing for peer authentication. The message below is directed from WS1 to WS2:

message 14={{data}/encPug*, Tgws1}/signPrg

Sixth Case

The sixth case assumes that there are two trust realms, in which services will operate as participants in the group, and that the separate trust realms comprise respective coordination Services that are to be used to manage the group. The components and their relationships are therefore shown in FIG. 8.

Figure 13:
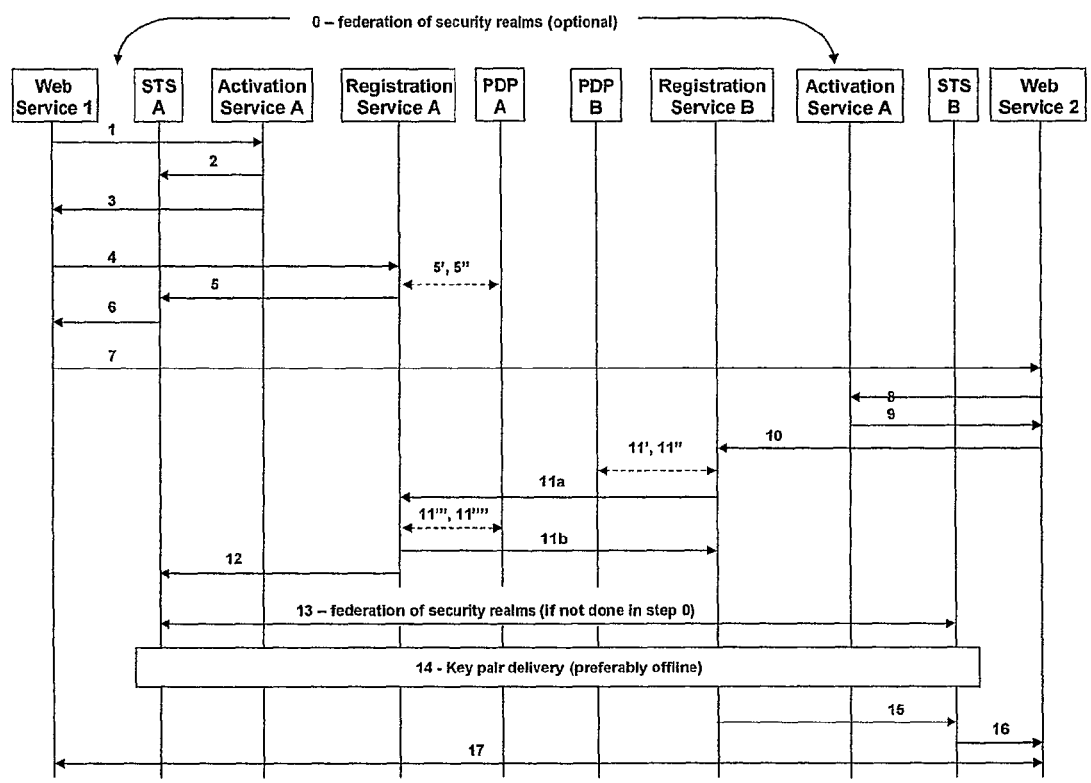
FIG. 13 is an operations flow chart illustrating the messages exchanged in the third example of the second embodiment.

The relationship between the components, illustrating the differences between the protocol of the sixth case and that of the fourth and fifth will now be explained in more detail with respect to FIG. 13. In this case, the group token includes an identifier of the group participant, such as Web service ID:

As before, steps 1 to 6 in which WS1 initially establishes the group and registers with the registration service are identical to the fourth and fifth case, only it is the STS A, and the activation and registration services A that are used. Thus, at the end of step 6, WS1 has received a personalised group token Tgws1, the group identifier GC, and the group public and private key.

In step 7, WS1 sends an application message to WS2 to pass the descriptive part of the context (GC), its personalised group token, and the address of registration service A to WS2. There is no need to pass identity token of WS1:

message 7={{WS2_ID}/signPrg, GC, RegAdrA, Tgws1}/signPrg

In Step 8, and 9, as the WS2 is configured to use a different coordination service, it sends request to the activation service B. This is different from the initial message 1 for WS1, as it contains the group context GC, created by Activation Service A and received from WS1. In step 9, activation service B returns the same GC, and provides the addresses for registration service A and B. The address of Registration Service A is received by WS2 from WS1, and is therefore passed to the registration service B with the registration request.

message 8={request, {WS2_ID}/signPrg, GC, Tws2}/signPrws2 message 9={GC, RegAdrA, RegAdrB}signPrab

There is no need for Activation Service B to contact the STS B at this stage (such as message 2 for the actions of WS1), since the key pair for the group already exists and will be delivered to STS B in one of the following steps.

In step 10, WS2 sends a registration request to the registration service B using the address received from activation service B in step 9. The address of registration service A is also transmitted:

message 10={request, GC, RegAdrA, Tws2}/signPrws2

In step 11 the Registration Service B communicates with the PDP B to verify that WS2 is authorised to join the group:

message 11' {AuthorisationRequest, Tws2}signPrrb message 11" {AuthorisationResponse}signPrpdpb If this is okay, the registration service B registers with the registration service A as interposed, on behalf of the service WS2:

message 11a={request, GC, Tg, Tws2, Trb}/signPrrb

The registration service A then communicates with the PDP A to verify that it can accept the interposed registration:

message 11'''={AuthorisationRequest, Tws2, Trb}signPrra message 11''''={AuthorisationResponse, Trb}signPrpdpa If this is okay, the Registration service A responds. However, the private key for the group is sent to the STS B in a separate communication (messages 13-15 below).

If there is a requirement to additionally guarantee the integrity and non-repudiation of the interactions between WS2 and registration service B (i.e. between a participant of the interposed registration service and the interposed registration service), then the original message 10 should be co-signed by registration service B, in order to form message 11:

message 11b={message 10}/signPrrb

In step 12, the registration service A communicates with the STS A to pass the key pair for the group to the STS B:

message 12={GC, KeypairDeliverRequest, Tws2}signPrra

If not already completed, federation between realms A and B needs to be established at this point in step 13 so that delivery of the group private key to WS2 can take place.

In step 14, the key pair for the group is delivered from STS A to STS B; it is stored at STS B to be used as a part of the group token for every service from trust realm B that needs to join the group.

In step 15, after performing security check on the WS2 at the responsible STS and PDP services, registration service B communicates with the STS B, requesting creation of the group token for WS2 (Tgws2) and delivery of Tgws2 and Prg to WS2:

message 15={GC, TokenCreateRequest, Tws2}signPrrb

Tgws2={GroupID, Pug, IDws2, ... }/signPrstsb

Note that in this case Tgws2 contains an identifier of the service that is successfully registered with the group.

In step 16, The STS B signs returns the personalised group token Tgws2 and the private group key Prg encrypted with the public key of the WS2:

message 16={{Prg}/encPuws2, Tgws2}/signPrstsb

The second web service WS2 is then a full group participant, and group communication at the application-level can take place between group participants, protected with the security context. Each message also includes the corresponding group token, allowing for peer authentication. The message below is directed from WS1 to WS2:

message 17={{data}/encPug*, Tgws1}/signPrg

If a service WS2' from realm B wants subsequently to join the group, messages 11, 12, 13 and 14 do not happen, as WS2' contain be registered with registration service B and receive a personalised group token and private key from STS B.

The advantage of the second method employed in the fourth, fifth and sixth case is that as the group token is personalised for each service so that it contains an ID, excluding a particular member from the group is easier. Pair-wise re-keying is still required with all group members as the Prg/Pug pair is still unique for all of the members. However, revoking a token is straightforward, by sending a message to the whole group as soon as token to be revoked is discovered:

message_revoc={invalid_token}/signPucs

The message can be issued and signed either by the coordination service or the STS. This information is maintained in a certificate revocation list and checked against incoming messages to confirm whether the token is valid. This is known as the certificate revocation list (CRL) method in the PKI literature.

However, in comparison to the first embodiment of the first, second and third cases the creation and exchange of the group token is more expensive as the token is different for each member.

It will be appreciated from the above description that the system and protocol according to the preferred embodiments of the invention provide a virtual security perimeter protecting the activity that makes the following possible:

1) Only participating services that receive the full context following successful registration are able to enter the group/activity interactions;
2) Interactions in the context of the group are not visible to outsiders, services that are not group members. This means both that outsiders are not able to take part in the communication, and group members are not able to propagate the information related to the particular context outside of the group.
3) Activation and registration services are not group members, as they do not have access to the full security context. These services only facilitate creation and propagation of the security context to the group participants.
4) Activation and registration services provide and manage life-cycle of the shared security context among a group of services in a federation of trust realms using security tokens.
5) The local identity of the group and/or of a service is bound to the shared security context of the group.
6) Services/participants assert their membership to the group by presenting the security context, and (a set of) tokens and keys that they have received from a group member of from the activation service.
7) In a distributed network, the evolution of the security perimeter protecting the group is automated, by utilising activation and registration services as well as specialised services which provide security policy, federation of trust realms, creation/translation of security tokens, and creation of corresponding security keys.
8) No previous knowledge of the group membership is assumed or required. The identities of the group members are not fixed a priori. Group membership evolves as new participants obtain authorisation to enter the group and share the same security context.

It will also be appreciated that the security system and protocol provided by the preferred embodiment has the following characteristics: a) a unique context for the group that includes a descriptive definition of the group (such as an identifier, the group purpose and the group membership), and an arbitrary set of keys and security tokens for securing interactions and access to the security perimeter—the number and structure of these depends on the number of trust realms contributing services to the group, and on the mode of the communication; and b) specialised activation and registration services are used for establishing the context.

Although, the preferred embodiments have been described with reference to specific computer architectures, this is only by way of example, and it would be possible to implement the invention in any suitable computer architecture having similar functionality. These would be apparent to the skilled man.

The invention claimed is:

1. A method of establishing a secure group of entities in a computer network, comprising:
operating a secure group management computer system including one or more policy-based decision nodes to:
a) receive a request from a first entity for the creation of a group;
b) create a group identifier, and a first public/private key pair for the group;
c) transmit the group identifier and first group public key to the first entity;
d) operate one of said policy-based decision nodes to check whether the first entity is authorised to join the group;
e) if said first entity is authorised to join the group, transmit the first group private key to the entity;
f) receive a request from a second entity to join the group specified by the group identifier, the request including an identifier of the second entity signed by the first entity using the first group private key; and
g) operate one of said policy-based decision nodes to check whether the second entity is authorised to join the group;
h) if said second entity is authorised to join the group, transmit the first group private key to the second entity, such that messages signed with the first group private key can be verified as messages from an authentic group member;
wherein step d) is performed by a policy-based decision node in a trust realm, and step g is performed by another policy-based decision node in another trust realm.

2. The method of claim 1, wherein step b) comprises generating a second group key, which is transmitted to the first and second entities, such that messages between the entities can be encrypted with the second group key.

3. The method of claim 2, wherein step b) comprises generating a second public/private key pair, and steps e) and h) comprise transmitting the second group private key to the first and second entities, such that only those entities that have received the second private decryption key can operate as group members.

4. The method of claim 1, wherein the first group public key is used to encrypt messages transmitted between the first entity and the second entity, and wherein the first private group key is used to decrypt the messages.

5. The method of claim 1, wherein the first entity transmits one or both of the group identifier and the group public key to the second entity, to invite the second entity into the group.

6. The method of claim 5, wherein the first entity transmits a challenge to the second entity, the challenge comprising an identifier for the second entity signed with the first group private key.

7. The method of claim 5, wherein the first or the second entity transmits one or more of the group identifier, group public key, and a challenge to a third entity, to invite the third entity into the group.

8. The method of claim 1, wherein the computer network comprises a co-ordination service comprising an activation service, and registration service, the co-ordination service being configured to carry out at least steps a), and d) through h).

9. A system configured to establish a secure group of entities in a computer network, comprising:
a secure group management computer system having one or more computers including one or more policy-based decision nodes, said one or more computers being configured to:
a) receive a request from a first entity for the creation of a group;
b) create a group identifier, and a first public/private key pair for the group;
c) transmit the group identifier and first group public key to the first entity;
one of said policy-based decision nodes being configured to:
d) verify whether the first entity is authorised to join the group;
said one or more computers being further configured to:
e) transmit the first group private key to the first entity if said policy-based decision node verifies that said first entity is authorised to join the group;
f) receive a request from a second entity to join the group specified by the group identifier, the request including an identifier of the second entity signed by the first entity using the first group private key;
one of said policy-based decision nodes being configured to:

g) verify whether the second entity is authorised to join the group;

said one or more computers being further configured to:

h) transmit the first group private key to the second entity, if said policy-based decision node verifies that said second entity is authorised to join the group, such that messages signed with the first group private key can be verified as messages from an authentic group member;

wherein one of said policy-based decision nodes, based in a trust realm, is configured to verify whether the first entity is authorised to join the group, and another of said policy-based decision nodes, based in another trust realm, is configured to verify whether the second entity is authorised to join the group.

10. The system of claim 9, wherein step b) comprises generating a second group key, which is transmitted to the first and second entities, such that messages between the entities can be encrypted with the second group key.

11. The system of claim 10, wherein step b) comprises generating a second public/private key pair, and steps d) and -g) comprise transmitting the second group private key to the first and second entities, such that only those entities that have received the second private decryption key can operate as group members.

12. The system of claim 9, wherein the first group public key is used to encrypt messages transmitted between the first entity and the second entity, and wherein the first private group key is used to decrypt the messages.

13. The system of claim 9, wherein the first entity is configured to transmit one or both of the group identifier and the group public key to the second entity, to invite the second entity into the group.

14. The system of claim 13, wherein the first entity is configured to transmit a challenge to the second entity, the challenge comprising an identifier for the second entity signed with the first group private key.

15. A non-transitory computer readable medium on which program code is stored, the program code being such that when executed on a computer the computer is caused to perform the steps of any of method claim 1.

16. A secure group management computer system including one or more policy-based decision nodes, said secure management computer system being configured to establish a secure group of entities in a computer network, the system comprising one or more data processing units in communication with one another, each of said data processing units having: a receiver, a processing unit and a transmitter; wherein:

a) one of said data processing units is configured to receive a request via its receiver from a first entity for the creation of a group;

b) the processing unit of said one of said data processing units is configured to create a group identifier, and a first public/private key pair for the group;

c) said one of said data processing units is configured to transmit the group identifier and first group public key to the first entity via its transmitter;

d) the processing unit of said one of said data processing units is configured to communicate with one of said policy-based decision nodes in determining, on the basis of declarative security policies, whether the first entity is authorized to join the group, and if it is, transmit the first group private key to the entity via its transmitter;

e) said one or another of said data processing units is configured to receive, via its receiver, a request from a second entity to join the group specified by the group identifier, the request including an identifier of the second entity signed by the first entity using the first group private key;

f) said one or another of said data processing units is configured to involve one of said policy-based decision nodes in determining, on the basis of declarative security policies, whether the second entity is authorized to join the group, and if it is, transmit, via its transmitter, the first group private key to the second entity, such that messages signed with the first group private key can be verified as messages from an authentic group member; and said one of said policy-based decision nodes is in a trust realm, and said one or another of said policy-based decision nodes is another of said policy-based decision nodes in another trust realm.

17. The system of claim 16, wherein the first entity is configured to transmit one or both of the group identifier and the group public key to the second entity, to invite the second entity into the group.

18. The system of claim 17, wherein the first entity is configured to transmit a challenge to the second entity, the challenge comprising an identifier for the second entity signed with the first group private key.

* * * * *